United States Patent
Lee et al.

(10) Patent No.: US 12,346,262 B2
(45) Date of Patent: Jul. 1, 2025

(54) COMPUTING SYSTEM INCLUDING MEMORY DEVICE AND STORAGE DEVICE THAT SHARE MAP DATA, AND OPERATING METHOD THEREOF

(71) Applicant: SAMSUNG ELECTRONICS CO., LTD., Suwon-si (KR)

(72) Inventors: Kyunghan Lee, Suwon-si (KR); Jae-Gon Lee, Suwon-si (KR); Chon Yong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 18/076,671

(22) Filed: Dec. 7, 2022

(65) Prior Publication Data

US 2023/0359566 A1    Nov. 9, 2023

(30) Foreign Application Priority Data

May 9, 2022    (KR) ........................ 10-2022-0056787

(51) Int. Cl.
  *G06F 12/10*    (2016.01)
(52) U.S. Cl.
  CPC ........ *G06F 12/10* (2013.01); *G06F 2212/205* (2013.01)
(58) Field of Classification Search
  CPC .... G06F 12/10; G06F 12/0246; G06F 3/0679; G06F 2212/7201; G06F 12/0292
  USPC .............. 711/103, 104, 12.007, 12.014, 202, 711/12.002, 12.017, 100, 113, 118, 149, 711/221, 12.001, 12.008
  See application file for complete search history.

(56) References Cited

U.S. PATENT DOCUMENTS

| | | | |
|---|---|---|---|
| 7,697,515 B2 | 4/2010 | Ofer et al. | |
| 10,528,259 B2 | 1/2020 | Lee et al. | |
| 10,896,089 B2 | 1/2021 | Helmick et al. | |
| 11,132,313 B2* | 9/2021 | Shan | G06F 13/4282 |
| 2013/0031296 A1* | 1/2013 | Na | G11B 27/36 |
| | | | 711/E12.007 |
| 2013/0124794 A1 | 5/2013 | Bux et al. | |
| 2014/0082260 A1 | 3/2014 | Oh et al. | |
| 2018/0136875 A1 | 5/2018 | Nimmagadda et al. | |
| 2019/0320020 A1 | 10/2019 | Lee et al. | |
| 2019/0324664 A1* | 10/2019 | Kim | G06F 3/0683 |

(Continued)

FOREIGN PATENT DOCUMENTS

KR    1020180054394 A    5/2018

*Primary Examiner* — Jared I Rutz
*Assistant Examiner* — Edward Waddy, Jr.
(74) *Attorney, Agent, or Firm* — Sughrue Mion, PLLC

(57) ABSTRACT

A computing system includes a host, a memory, and a storage device. The memory includes a volatile memory and a memory controller. The storage device is connected with the host through a first interface and includes a nonvolatile memory and a storage controller, the storage device communicating with the host through a first port, communicating with the memory through a second port, and managing the memory. The memory is connected with the storage device through a second interface that is physically separated from the first interface. In an initialization operation, the storage controller sends map data that is stored in the nonvolatile memory to the memory through the second interface. In the initialization operation, the memory controller stores the map data in the volatile memory.

20 Claims, 18 Drawing Sheets

(56) References Cited

U.S. PATENT DOCUMENTS

| | | |
|---|---|---|
| 2020/0125503 A1 | 4/2020 | Graniello et al. |
| 2021/0089225 A1* | 3/2021 | Boyd |
| 2022/0121517 A1* | 4/2022 | Kim .................... G06F 11/1417 |
| 2023/0297236 A1* | 9/2023 | Hinkle ................ G06F 12/0888 |
| | | 711/154 |

* cited by examiner

COMPUTING SYSTEM INCLUDING MEMORY DEVICE AND STORAGE DEVICE THAT SHARE MAP DATA, AND OPERATING METHOD THEREOF

CROSS-REFERENCE TO RELATED APPLICATION

This application claims priority under 35 U.S.C. § 119 to Korean Patent Application No. 10-2022-0056787 filed on May 9, 2022, in the Korean Intellectual Property Office, the disclosure of which being incorporated by reference herein in its entirety.

BACKGROUND

Embodiments of the present disclosure described herein relate to an electronic device, and more particularly, relate to a computing device including a memory device and a storage device, and an operating method thereof.

A semiconductor memory device is classified as a volatile memory device, in which stored data disappear when a power is turned off, such as a static random access memory (SRAM) or a dynamic random access memory (DRAM), or a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

A storage device such as a solid state drive may include a NAND flash memory. A system of logical block addresses used in a host is different from a system of physical block addresses of the NAND flash memory of the storage device. For this reason, the storage device may perform translation between a logical block address of the host and a physical block address of the NAND flash memory by using map data in which the logical block address and the physical block address are mapped.

As the capacity of the NAND flash memory increases, the capacity of the map data may also increase. As such, there may be required a high-capacity buffer memory to be used in the storage device, thereby causing costs for new research and development.

SUMMARY

It is an aspect to provide a computing device including a memory device and a storage device, and an operating method thereof.

According to an aspect of one or more embodiments, there is provided a computing system comprising a host; a memory including a volatile memory and a memory controller; and a storage device that is connected with the host through a first interface and that includes a nonvolatile memory and a storage controller, the storage device being configured to communicate with the host through a first port, to communicate with the memory through a second port, and to manage the memory, wherein the memory is connected with the storage device through a second interface that is physically separated from the first interface, wherein, in an initialization operation, the storage controller sends map data that is stored in the nonvolatile memory to the memory through the second interface, and wherein, in the initialization operation, the memory controller stores the map data in the volatile memory.

According to another aspect of one or more embodiments, there is provided an operating method of a computing system which includes a host, a storage device, and a memory, the host and the storage device being connected through a first interface, and the storage device and the memory being connected through a second interface, the operating method comprising sending, by the storage device, map data that is stored in a nonvolatile memory of the storage device to the memory through the second interface in an initialization operation; storing, by the memory, the map data in a volatile memory of the memory in the initialization operation; sending, by the storage device, a first read request to the memory through the second interface after the initialization operation; and sending, by the memory, first partial map data to the storage device through the second interface based on the first read request, wherein the first interface and the second interface are based on a compute express link (CXL) protocol and the first interface is physically separated from the second interface.

According to yet another aspect of one or more embodiments, there is provided a computing system comprising a host; a storage device that includes a nonvolatile memory and a storage controller; a memory that includes a volatile memory and a memory controller; and a switch connected with the host and the storage device, wherein the memory is connected with the storage device, wherein the storage device is configured to communicate with the host through a first port, to communicate with the memory through a second port, and to manage the memory, wherein, in an initialization operation, the storage controller sends map data that is stored in the nonvolatile memory to the memory through the second port, and wherein, in the initialization operation, the memory controller stores the map data in the volatile memory.

BRIEF DESCRIPTION OF THE FIGURES

The above and other aspects will become apparent by describing in detail embodiments thereof with reference to the accompanying drawings, in which.

DETAILED DESCRIPTION

Below, various embodiments will be described in detail and clearly to such an extent that one skilled in the art easily carries out the present disclosure.

Figure 1:
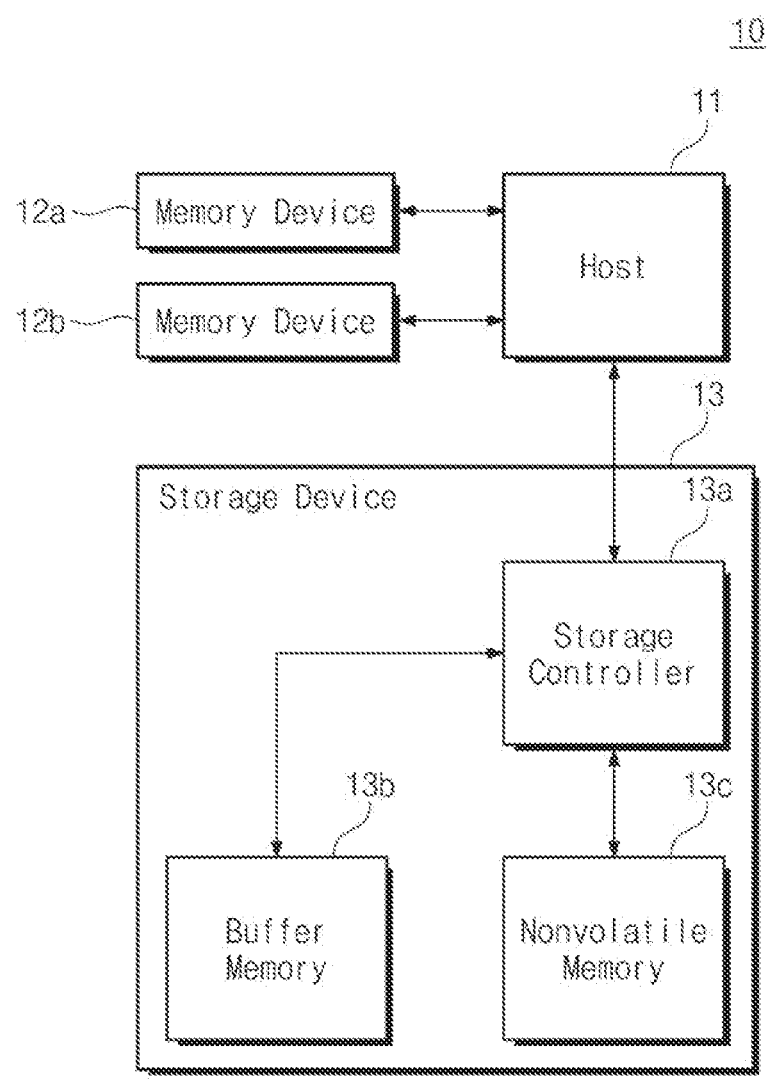
FIG. 1 is a block diagram illustrating a computing system including a storage device.

FIG. 1 is a block diagram illustrating a computing system including a storage device. Referring to FIG. 1, a computing system 10 may include a host 11, a plurality of memory devices 12a and 12b, and a storage device 13. The host 11 may control an overall operation of the computing system 10. The plurality of memory devices 12a and 12b may be used as a working memory or a system memory of the host 11.

The storage device 13 may include a storage controller 13a, a buffer memory 13b, and a nonvolatile memory 13c. Under control of the host 11, the storage controller 13a may store data in the nonvolatile memory 13c or may send data stored in the nonvolatile memory 13c to the host 11.

The buffer memory 13b may store a variety of information for the storage device 13 to operate. For example, the storage controller 13a may manage data stored in the nonvolatile memory 13c by using map data. The map data may include information about relationship between a logical block address managed by the host 11 and a physical block address of the nonvolatile memory 13c.

In an embodiment, the buffer memory 13b may be a high-speed memory such as a DRAM. As the capacity of the nonvolatile memory 13c increases, the size of necessary map data may increase. However, because the capacity of the buffer memory 13b included in the single storage device 13 is limited, it is impossible to cope with the increase in the size of the map data due to the increase in the capacity of the nonvolatile memory 13c.

Figure 2A:
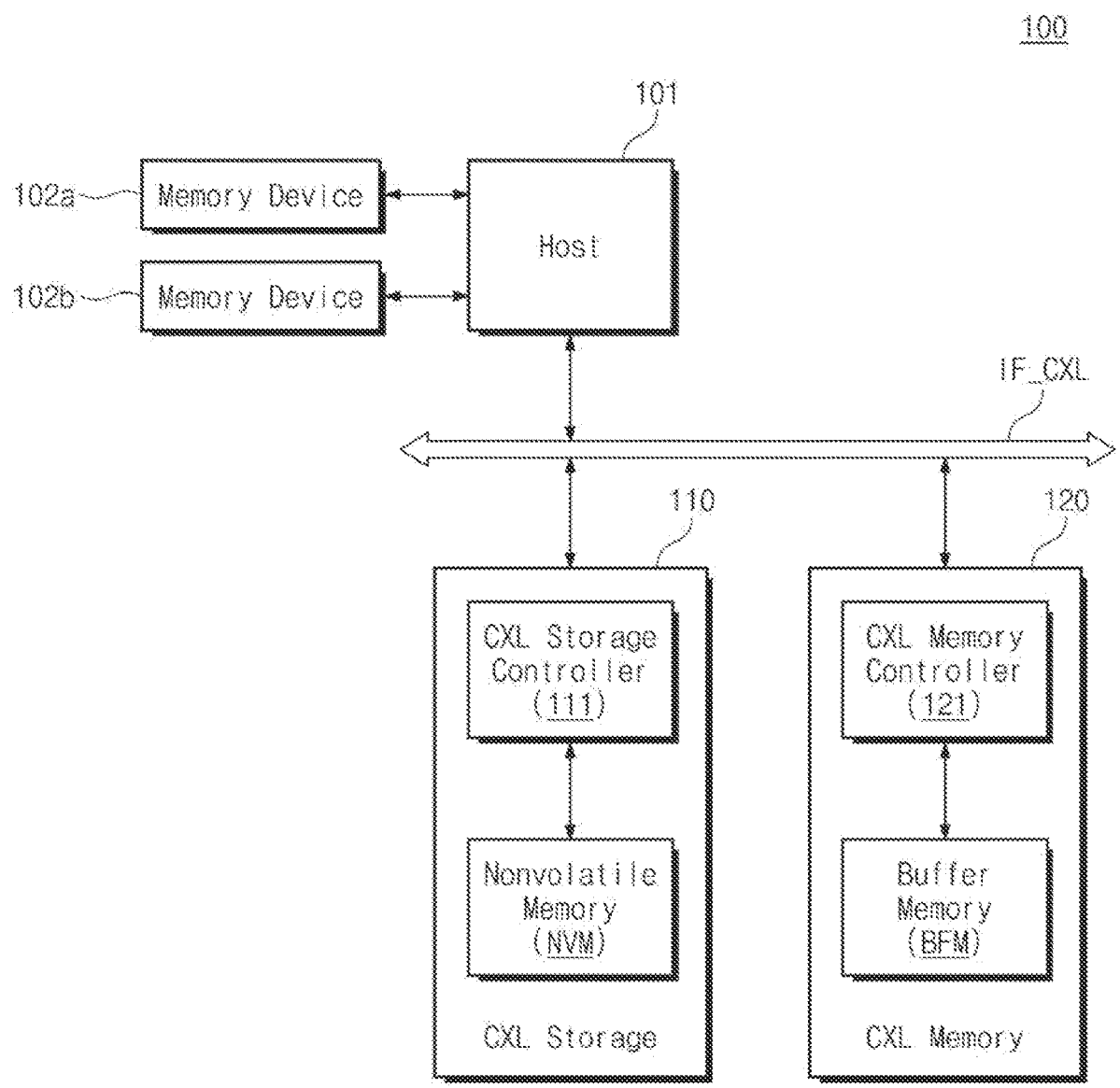
FIG. 2A is a block diagram of a computing system to which a storage system is applied, according to some embodiments.

FIG. 2A is a block diagram of a computing system to which a storage system is applied, according to some embodiments. Referring to FIG. 2A, a computing system 100 may include a host 101, a plurality of memory devices 102a and 102b, a Compute eXpress Link (CXL) storage 110, and a CXL memory 120.

The host 101 may control an overall operation of the computing system 100. In an embodiment, the host 101 may be one of various processors such as a central processing unit (CPU), a graphics processing unit (GPU), a neural processing unit (NPU), and/or a data processing unit (DPU). In an embodiment, the host 101 may include a single core processor or a multi-core processor.

The plurality of memory devices 102a and 102b may be used as a main memory or a system memory of the computing system 100. In an embodiment, each of the plurality of memory devices 102a and 102b may be a dynamic random access memory (DRAM) device and may have the form factor of the dual in-line memory module (DIMM). However, the present disclosure is not limited thereto. For example, the plurality of memory devices 102a and 120b may include a nonvolatile memory such as a flash memory, a phase change RAM (PRAM), a resistive RAM (RRAM), or a magnetic RAM (MRAM).

The plurality of memory devices 102a and 102b may directly communicate with the host 101 through a Double Data Rate (DDR) interface. In an embodiment, the host 101 may include a memory controller configured to control the plurality of memory devices 102a and 102b. However, the present disclosure is not limited thereto. For example, the plurality of memory devices 102a and 102b may communicate with the host 101 through various interfaces.

The CXL storage 110 may include a CXL storage controller 111 and a nonvolatile memory NVM. Under control of the host 101, the CXL storage controller 111 may store data in the nonvolatile memory NVM or may send data stored in the nonvolatile memory NVM to the host 101. In an embodiment, the nonvolatile memory NVM may be a NAND flash memory, but the present disclosure is not limited thereto.

The CXL memory 120 may include a CXL memory controller 121 and a buffer memory BFM. Under control of the host 101, the CXL memory controller 121 may store data in the buffer memory BFM or may send data stored in the buffer memory BFM to the host 101. In an embodiment, the buffer memory BFM may be a DRAM, but the present disclosure is not limited thereto.

In an embodiment, the host 101, the CXL storage 110, and the CXL memory 120 may be configured to share the same interface. For example, the host 101, the CXL storage 110, and the CXL memory 120 may communicate with each other through a CXL interface IF_CXL.

In an embodiment, unlike the storage device 13 of FIG. 1, the CXL storage 110 may not include a separate buffer memory for storing or managing map data. In this case, the CXL storage 110 may require a buffer memory for storing or managing the map data. In an embodiment, at least a partial area of the CXL memory 120 may be used as a buffer memory of the CXL storage 110. In this case, a mapping table that is managed by the CXL storage controller 111 of the CXL storage 110 may be stored in the CXL memory 120. For example, at least a partial area of the CXL memory 120 may be allocated for a buffer memory of the CXL storage 110 (i.e., for an area dedicated for the CXL storage 110) by the host 101.

In an embodiment, the CXL storage 110 may access the CXL memory 120 through the CXL interface IF_CXL. For example, the CXL storage 110 may store the mapping table in the allocated area of the CXL memory 120 or may read the mapping table from the allocated area of the CXL memory 120. Under control of the CXL storage 110, the CXL memory 120 may store data (e.g., the map data) in the buffer memory BFM or may send the data (e.g., the map data) stored in the buffer memory BFM to the CXL storage 110.

In an embodiment, the storage controller 13a of the related art storage device 13 communicates with the host 11 through a host interface such as PCIe or NVMe, and communicates with the buffer memory 13b through a memory interface such as a DDR interface or an LPDDR interface. That is, the storage controller 13a of the related art storage device 13 communicates with the host 11 and the buffer memory 13b included therein, through different interfaces (i.e., heterogeneous interfaces).

In contrast, according to some embodiments, the CXL storage controller 111 of the CXL storage 110 may communicate with the host 101 and the CXL memory 120 (i.e., a buffer memory) through the CXL interface IF_CXL. In other words, the CXL storage controller 111 of the CXL storage 110 may communicate with the host 101 and the CXL memory 120 through a homogeneous interface or a common interface and may use a partial area of the CXL memory 120 as a buffer memory.

Figure 2B:
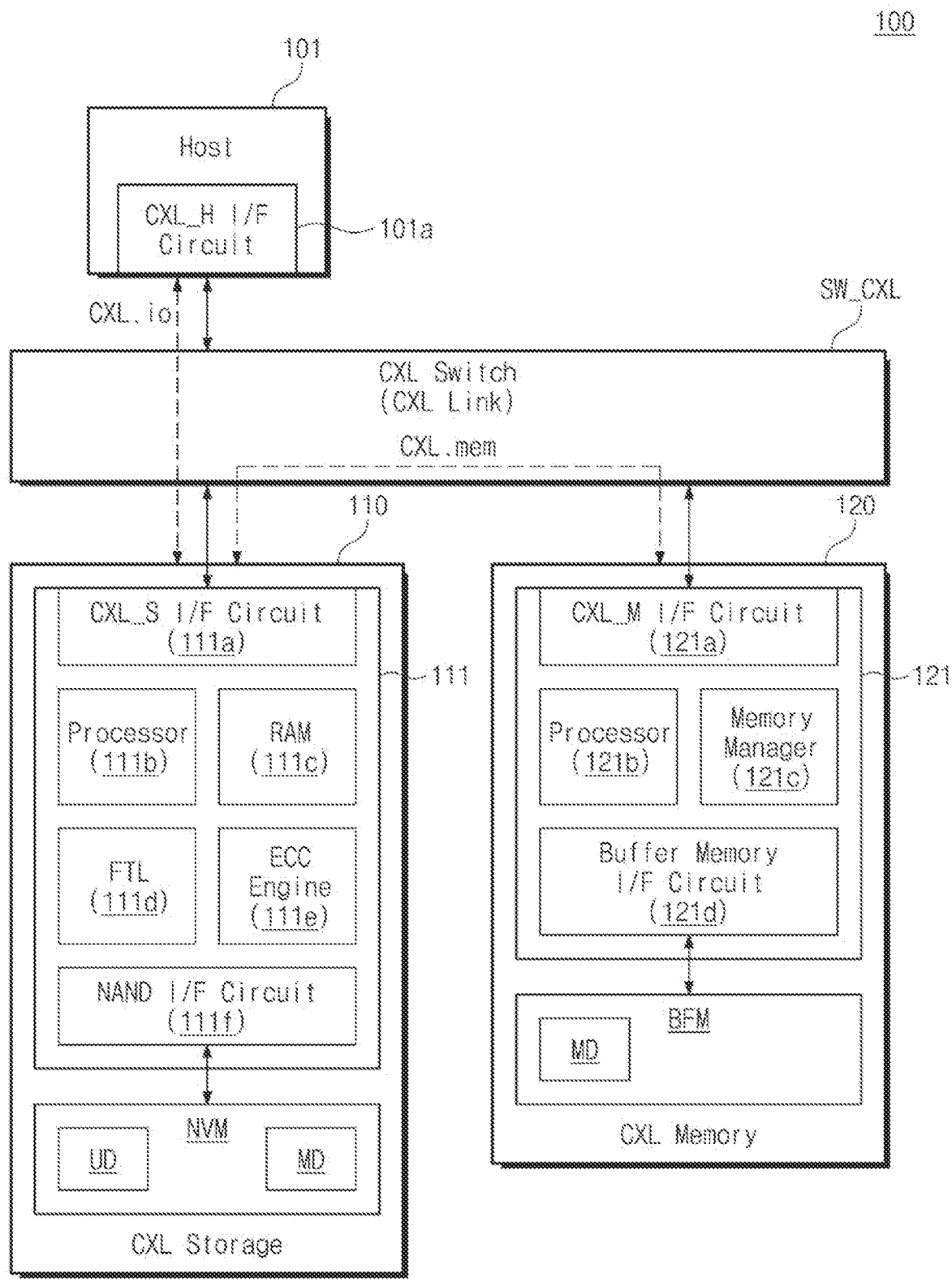
FIG. 2B is a block diagram illustrating components of a computing system of FIG. 2A in detail, according to some embodiments.

FIG. 2B is a block diagram illustrating components of a computing system of FIG. 2A in detail, according to some embodiments. Referring to FIGS. 2A and 2B, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate the communication between the host 101, the CXL storage 110, and the CXL memory 120. For example, when the host 101 and the CXL storage 110 communicate with each other, the CXL switch SW_CXL may be configured to send information, which is provided from the host 101 or the CXL storage 110, such as a request, data, a response, or a signal, to the CXL storage 110 or the host 101. When the host 101 and the CXL memory 120 communicate with each other, the CXL switch SW_CXL may be configured to send information, which is provided from the host 101 or the CXL memory 120, such as a request, data, a response, or a signal, to the CXL memory 120 or the host 101. When the CXL storage 110 and the CXL memory 120 communicate with each other, the CXL switch SW_CXL may be configured to send information, which is provided from the CXL storage 110 or the CXL memory 120, such as a request, data, a response, or a signal, to the CXL memory 120 or the CXL storage 110.

The host 101 may include a CXL host interface (I/F) circuit 101a. The CXL host interface circuit 101a may communicate with the CXL storage 110 or the CXL memory 120 through the CXL switch SW_CXL.

The CXL storage 110 may include the CXL storage controller 111 and the nonvolatile memory NVM. The CXL storage controller 111 may include a CXL storage interface (I/F) circuit 111a, a processor 111b, a RAM 111c, a flash translation layer (FTL) 111d, an error correction code (ECC) engine 111e, and a NAND interface (I/F) circuit 111f.

The CXL storage interface circuit 111a may be connected with the CXL switch SW_CXL. The CXL storage interface circuit 111a may communicate with the host 101 or the CXL memory 120 through the CXL switch SW_CXL.

The processor 111b may be configured to control an overall operation of the CXL storage controller 111. The RAM 111c may be used as a working memory or a buffer memory of the CXL storage controller 111. In an embodiment, the RAM 111c may be an SRAM and may be used as a read buffer and a write buffer for the CXL storage 110. In an embodiment, as will be described below, the RAM 111c may be configured to temporarily store the map data MD read from the CXL memory 120 or a portion of the map data MD.

The FTL 111d may perform various management operations for efficiently using the nonvolatile memory NVM. For example, the FTL 111d may perform address translation between a logical block address managed by the host 101 and a physical block address used in the nonvolatile memory NVM, based on map data (or a mapping table). The FTL 111d may perform a bad block management operation for the nonvolatile memory NVM. The FTL 111d may perform a wear leveling operation for the nonvolatile memory NVM. The FTL 111d may perform a garbage collection operation for the nonvolatile memory NVM.

The ECC engine 111e may perform error detection and correction on data read from the nonvolatile memory NVM. For example, the ECC engine 111e may generate parity bits for user data UD to be stored in the nonvolatile memory NVM, and the parity bits thus generated may be stored in the nonvolatile memory NVM together with the user data UD. When the user data UD are read from the nonvolatile memory NVM, the ECC engine 111e may detect and correct an error of the user data UD by using the parity bits read from the nonvolatile memory NVM together with the user data UD.

The NAND interface circuit 111f may control the nonvolatile memory NVM such that data are stored in the nonvolatile memory NVM or data are read from the nonvolatile memory NVM. In an embodiment, the NAND interface circuit 111f may be implemented to comply with the standard protocol such as a toggle interface or ONFI. For example, the nonvolatile memory NVM may include a plurality of NAND flash devices. In the case where the NAND interface circuit 111f is implemented based on the toggle interface, the NAND interface circuit 111f communicates with the plurality of NAND flash devices through a plurality of channels. The plurality of NAND flash devices may be connected with the plurality of channels through a multi-channel, multi-way structure.

The nonvolatile memory NVM may store or output the user data UD under control of the CXL storage controller 111. The nonvolatile memory NVM may store or output the map data MD under control of the CXL storage controller 111. In an embodiment, the map data MD stored in the nonvolatile memory NVM may include mapping information corresponding to the entire user data UD stored in the nonvolatile memory NVM. The map data MD present in the nonvolatile memory NVM may be stored in the CXL memory 120 in the initialization operation of the CXL storage 110.

The CXL memory 120 may include the CXL memory controller 121 and the buffer memory BFM. The CXL memory controller 121 may include a CXL memory interface (I/F) circuit 121a, a processor 121b, a memory manager 121c, and a buffer memory interface (I/F) circuit 121d.

The CXL memory interface circuit 121a may be connected with the CXL switch SW_CXL. The CXL memory interface circuit 121a may communicate with the host 101 or the CXL storage 110 through the CXL switch SW_CXL.

The processor 121b may be configured to control an overall operation of the CXL memory controller 121. The memory manager 121c may be configured to manage the buffer memory BFM. For example, the memory manager 121c may be configured to translate a memory address (e.g., a logical address or a virtual address) from the host 101 or the CXL storage 110 into a physical address for the buffer memory BFM. In an embodiment, the memory address that is an address for managing a storage area of the CXL memory 120 may be a logical address or a virtual address that is designated and managed by the host 101.

The buffer memory interface circuit 121d may control the buffer memory BFM such that data are stored in the buffer memory BFM or data are read from the buffer memory BFM. In an embodiment, the buffer memory interface circuit 121d may be implemented to comply with the standard protocol such as a DDR interface or an LPDDR interface.

Under control of the CXL memory controller 121, the buffer memory BFM may store data or may output the stored data. In an embodiment, the buffer memory BFM may be configured to store the map data MD that are used in the CXL storage 110. The map data MD may be transferred from the CXL storage 110 to the CXL memory 120 when the computing system 100 is initialized or the CXL storage 110 is initialized.

As described above, the CXL storage 110 according to some embodiments may store the map data MD, which are used to manage the nonvolatile memory NVM, in the CXL memory 120 connected through the CXL switch SW_CXL (or the CXL interface IF_CXL). Afterwards, when the CXL storage 110 performs the read operation depending on a request of the host 101, the CXL storage 110 may read at least a portion of the map data MD from the CXL memory 120 through the CXL switch SW_CXL (or the CXL interface IF_CXL) and may perform the read operation based on the map data MD thus read. In some embodiments, when the CXL storage 110 performs the write operation depending on a request of the host 101, the CXL storage 110 may perform the write operation on the nonvolatile memory NVM and may update the map data MD. In this case, the updated map data MD may be first stored in the RAM 111$c$ of the CXL storage controller 111, and the map data MD stored in the RAM 111$c$ may be transferred to the buffer memory BFM of the CXL memory 120 through the CXL switch SW_CXL (or the CXL interface IF_CXL), so as to be update in the buffer memory BFM.

In an embodiment, at least a partial area of the buffer memory BFM of the CXL memory 120 may be allocated for a dedicated area for the CXL storage 110, and the remaining area other than the dedicated area may be used as an area that is capable of being accessed by the host 101.

In an embodiment, the host 101 and the CXL storage 110 may communicate with each other by using CXL.io being an input/output protocol. The CXL.io may have a PCIe-based non-coherency input/output protocol. The host 101 and the CXL storage 110 may exchange user data or variety of information with each other by using the CXL.io.

In an embodiment, the CXL storage 110 and the CXL memory 120 may communicate with each other by using CXL.mem being a memory access protocol. The CXL.mem may be a memory access protocol that supports memory access. The CXL storage 110 may access a partial area (e.g., an area where the map data MD are stored or a CXL storage-dedicated area) of the CXL memory 120 by using the CXL.mem.

In an embodiment, the host 101 and the CXL memory 120 may communicate with each other by using CXL.mem being a memory access protocol. The host 101 may access, as a system memory, the remaining area (e.g., the remaining area other than the area where the map data MD are stored or the remaining area other than the CXL storage-dedicated area) of the CXL memory 120 by using the CXL.mem. The above access types including CXL.io and CXL.mem are provided as an example, and the present disclosure is not limited thereto.

Figure 3A:
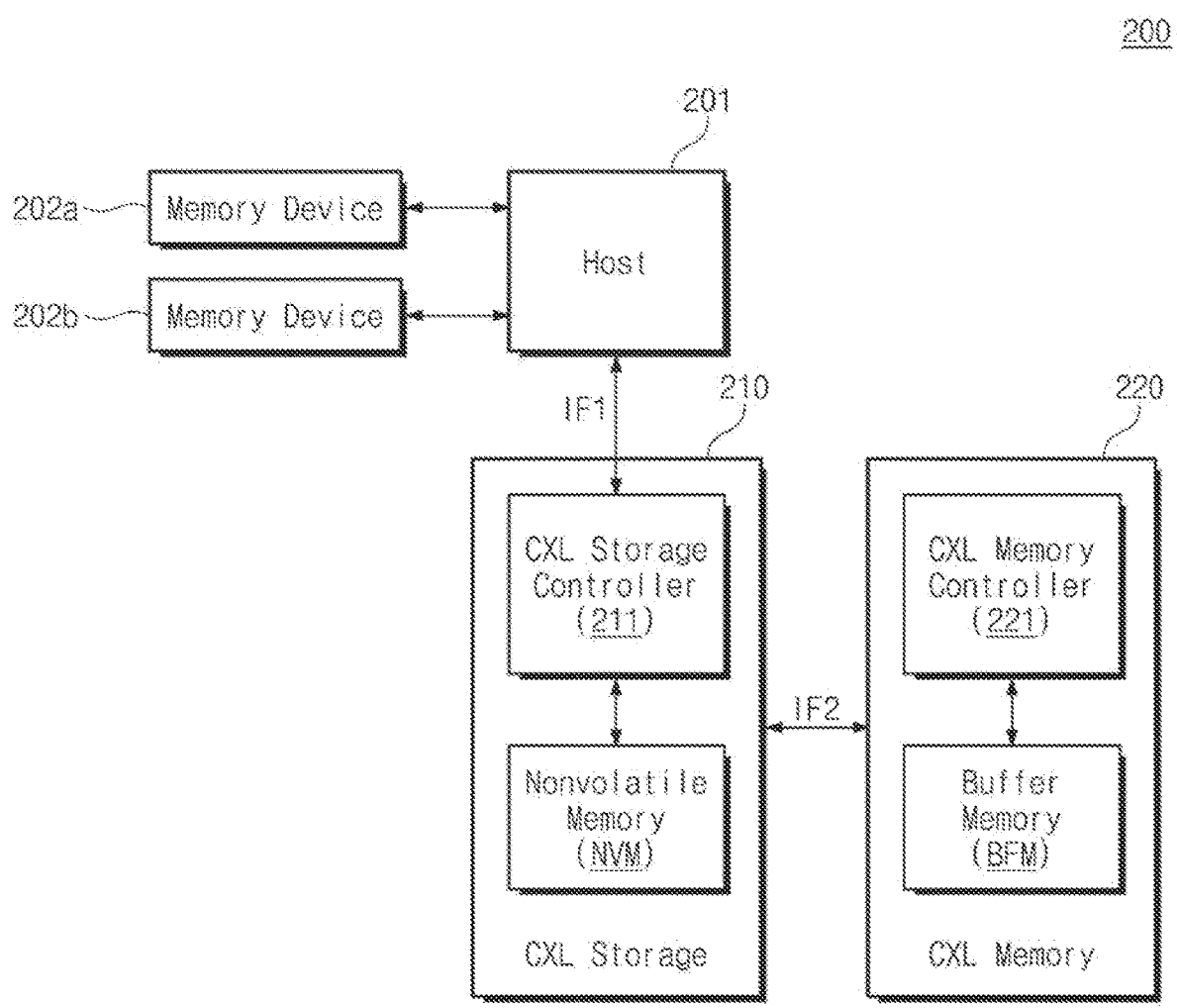
FIG. 3A is a block diagram illustrating a computing system to which a storage system, according to some embodiments is applied.

FIG. 3A is a block diagram illustrating a computing system to which a storage system according to some embodiments is applied. Referring to FIG. 3A, a computing system 200 may include a host 201, a plurality of memory devices 202$a$ and 202$b$, a Compute eXpress Link (CXL) storage 210, and a CXL memory 220. In an embodiment, the computing system 200 may be included in user devices such as a personal computer, a laptop computer, a server, a media player, and a digital camera or automotive devices such as a navigation system, a black box, and an automotive electronic device/part, etc. In some embodiments, the computing system 200 may be a mobile system such as a mobile phone, a smartphone, a tablet personal computer (PC), a wearable device, a health care device, or an Internet of things (IoT) device.

The host 201 may control an overall operation of the computing system 200. In an embodiment, the host 201 may be one of various processors such as a central processing unit (CPU), a graphics processing unit (GPU), a neural processing unit (NPU), and/or a data processing unit (DPU). In an embodiment, the host 201 may include a single core processor or a multi-core processor.

The plurality of memory devices 202$a$ and 202$b$ may be used as a main memory or a system memory of the computing system 200. In an embodiment, each of the plurality of memory devices 202$a$ and 202$b$ may be a dynamic random access memory (DRAM) device and may have the form factor of the dual in-line memory module (DIMM). However, the present disclosure is not limited thereto. For example, the plurality of memory devices 202$a$ and 120$b$ may include a nonvolatile memory such as a flash memory, a phase change RAM (PRAM), a resistive RAM (RRAM), or a magnetic RAM (MRAM).

The plurality of memory devices 202$a$ and 202$b$ may directly communicate with the host 201 through the DDR interface. In an embodiment, the host 201 may include a memory controller configured to control the plurality of memory devices 202$a$ and 202$b$. However, the present disclosure is not limited thereto. For example, the plurality of memory devices 202$a$ and 202$b$ may communicate with the host 201 through various interfaces.

The CXL storage 210 may include a CXL storage controller 211 and the nonvolatile memory NVM. Under control of the host 201, the CXL storage controller 211 may store data in the nonvolatile memory NVM or may send data stored in the nonvolatile memory NVM to the host 201. In an embodiment, the nonvolatile memory NVM may be a NAND flash memory, but the present disclosure is not limited thereto.

The CXL memory 220 may include a CXL memory controller 221 and the buffer memory BFM. Under control of the CXL storage 210, the CXL memory controller 221 may store data in the buffer memory BFM or may send data stored in the buffer memory BFM to the CXL storage 210. In an embodiment, the buffer memory BFM may be a DRAM, but the present disclosure is not limited thereto.

In an embodiment, unlike the computing system 100 of FIG. 2A, the computing system 200 may be configured not to share the same interface. That is, the host 101, the CXL storage 110, and the CXL memory 120 of FIG. 2A may be configured to share the same interface. For example, the host 101, the CXL storage 110, and the CXL memory 120 may communicate with each other through the CXL interface IF_CXL. In the case of the configuration of FIG. 2A where the communications between the CXL storage 110 and the CXL memory 120 increase, the communications between the CXL storage 110 and the host 101 may be affected by the increase in the communications between the CXL storage 110 and the CXL memory 120. In other words, the communications between the CXL storage 110 and the CXL memory 120 may cause the reduction of performance of the communications between the CXL storage 110 and the host 101 and an increase in latency.

In contrast, in some embodiments, the host 201, the CXL storage 210, and the CXL memory 220 may be configured not to share the same interface. For example, the host 201 and the CXL storage 210 may communicate with each other through a first interface IF1, and the CXL storage 210 and the CXL memory 220 may communicate with each other through a second interface IF2. That is, the CXL storage 210, the CXL memory 220, and the host 201 may communicate with each other by using different interfaces (or links). As such, the communications between the CXL storage 210 and the CXL memory 220 may not affect the communications between the CXL storage 110 and the host 201. The communications between the CXL storage 210 and the CXL memory 220 may be independent of the communications between the CXL storage 210 and the host 201. Since the independent link is used between the CXL storage 210 and the CXL memory 220, a computing system with improved performance is provided.

The first interface IF1 and the second interface IF2 may be physically separated from each. The first and second interfaces IF2 and IF2 may be implemented with the CXL interface. In an embodiment, the CXL interface IF_CXL may indicate a low-latency and high-bandwidth link that supports coherency, memory access, and dynamic protocol muxing of IO protocols such that various connections between accelerators, memory devices, or various electronic devices are possible.

In an embodiment, unlike the storage device 13 of FIG. 1, the CXL storage 210 may not include a separate buffer memory for storing or managing map data. In this case, the CXL storage 210 may require a buffer memory for storing or managing the map data. In an embodiment, at least a partial area or the entire area of the CXL memory 220 may be used as a buffer memory of the CXL storage 210. In this case, a mapping table that is managed by the CXL storage controller 211 of the CXL storage 210 may be stored in the CXL memory 220. For example, at least a partial area or the entire area of the CXL memory 220 may be allocated for a buffer memory of the CXL storage 210 (i.e., for an area dedicated for the CXL storage 210) by the CXL storage 210.

In an embodiment, the CXL storage 210 may access the CXL memory 220 through the second interface IF2. For example, the CXL storage 210 may store the mapping table in the allocated area of the CXL memory 220 or may read the mapping table from the allocated area of the CXL memory 120. Under control of the CXL storage 210, the CXL memory 220 may store data (e.g., the map data) in the buffer memory BFM or may send the data (e.g., the map data) stored in the buffer memory BFM to the CXL storage 210.

As described with reference to FIG. 1, the related art storage device 13 stores and manages the map data by using the buffer memory 13b included therein. As the capacity of the storage device 13 increases, the size of the map data increase, thereby causing an increase in the capacity of the buffer memory 13b included in the storage device 13. However, there is a limitation on an increase in capacity due to the structure and physical characteristic of the buffer memory 13b included in the storage device 13; in this case, the design change or additional integration of the buffer memory 13b is required.

In contrast, according to some embodiments, the CXL storage 210 may use at least a partial area of the CXL memory 220 placed outside the CXL storage 210 as a buffer memory. In this case, because the CXL memory 220 is implemented independently of the CXL storage 210, the CXL memory 120 may be implemented with a high-capacity memory. As such, even though the size of the map data increases due to an increase in the capacity of the CXL storage 210, the map data may be normally managed by the CXL memory 220.

In an embodiment, the storage controller 13a of the related art storage device 13 communicates with the host 11 through the host interface such as PCIe or NVMe, and communicates with the buffer memory 13b through the memory interface such as a DDR interface or an LPDDR interface. That is, the storage controller 13a of the related art storage device 13 communicates with the host 11 and the buffer memory 13b included therein, through different interfaces (i.e., heterogeneous interfaces).

In contrast, according to some embodiments, the CXL storage controller 211 of the CXL storage 210 may communicate with the host 201 through the first interface IF1 and may communicate with the CXL memory 220 (i.e., a buffer memory) through the second interface IF2. Thus, different interfaces (or links) may be used such that the communications between the CXL storage 210 and the host 201 do not conflict with the communications between the CXL storage 210 and the CXL memory 220. As such, the communications between the CXL storage 210 and the CXL memory 220 may not affect the communications between the CXL storage 110 and the host 201.

As described above, the CXL storage 210 and the CXL memory 220 may be directly connected. The host 201 may not directly recognize the CXL memory 220. The host 201 may not directly access the CXL memory 220. The host 201 may not control or manage the CXL memory 220. Instead, the CXL storage 210 may control or manage the CXL memory 220. The CXL storage 210 may be configured to control an overall operation of the CXL memory 220. For example, the CXL storage 210 may direct the CXL memory 220 to perform the initialization operation or the power-off operation.

Below, for convenience of description, it is assumed that the host 201 and the CXL storage 210 communicate with each other through the first interface IF1 and the CXL storage 210 and the CXL memory 220 communicate with each other through the second interface IF2, and that all the first and second interfaces IF2 and IF2 are implemented with the CXL interface. However, the present disclosure is not limited thereto. For example, the host 201, the CXL storage 210, and the CXL memory 220 may communicate with each other based on various computing interfaces complying with the following: GEN-Z protocol, NVLink protocol, CCIX protocol, and Open CAPI protocol.

Figure 3B:
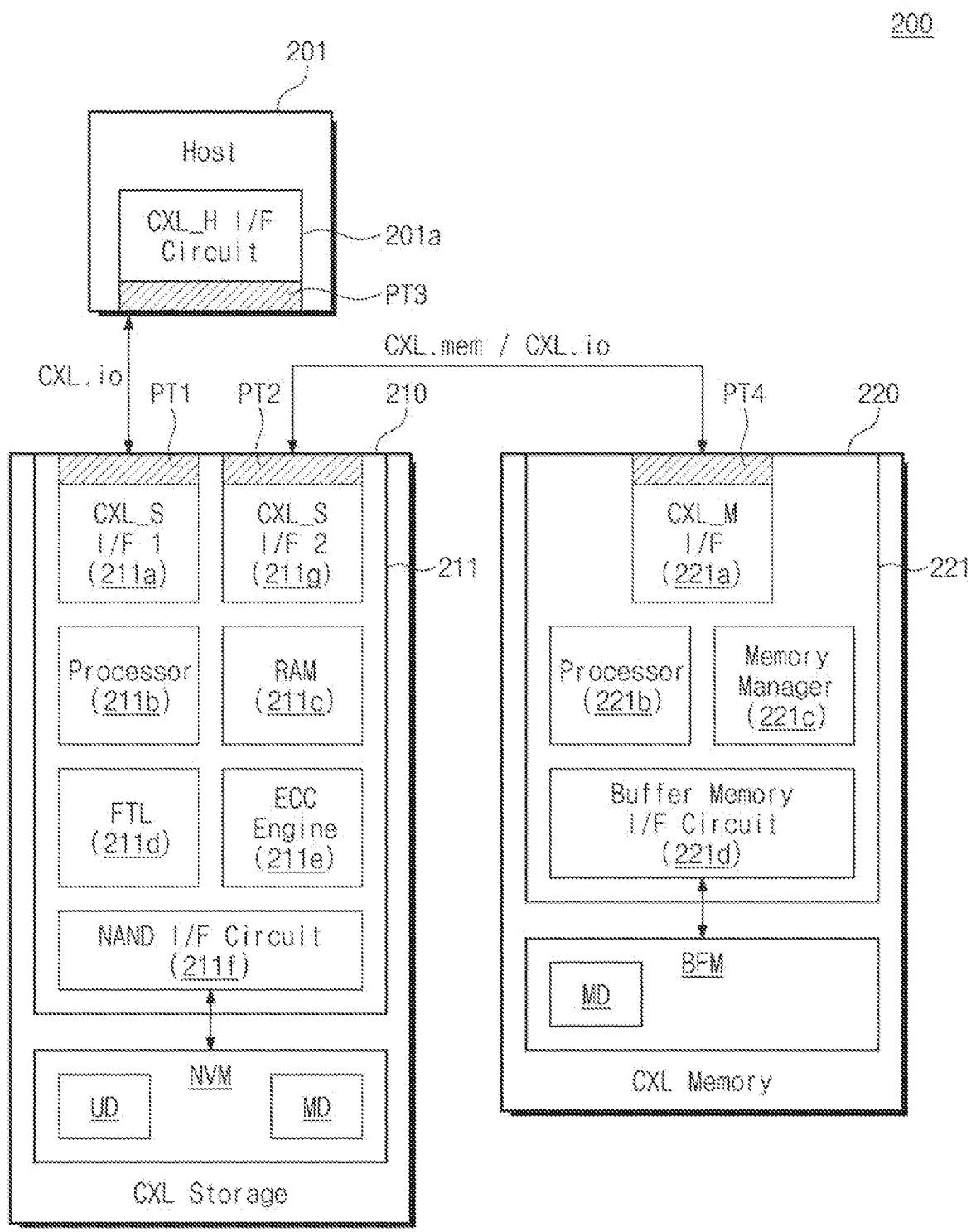
FIG. 3B is a block diagram illustrating components of a computing system of FIG. 3A in detail, according to some embodiments.

FIG. 3B is a block diagram illustrating components of a computing system of FIG. 3A in detail, according to some embodiments. Referring to FIGS. 3A and 3B, the computing system 200 may include the host 201, the CXL storage 210, and the CXL memory 220.

The host 201 may include a CXL host interface (I/F) circuit 201a. The CXL host interface circuit 201a may include a third port PT3. The CXL host interface circuit 201a may send and receive information, such as a request, data, a response, or a signal, through the third port PT3. The third port PT3 may be a circuit or a physical layer configured to send and receive a physical signal complying with the CXL or PCIe protocol. The CXL host interface circuit 201a may communicate with the CXL storage 210 through the first interface IF1. In an embodiment, because the CXL memory 220 is not connected with the first interface IF1, the host 201 may not communicate with the CXL memory 220.

In an embodiment, a configuration of the CXL storage 210 may be different from configurations of related art storages. For example, the related art storage device (e.g., an SSD including a DRAM buffer) stores and manages map data in the DRAM buffer included in the related art storage device. In this case, a high-capacity DRAM buffer for storing the map data should be included in the related art storage device. Alternatively, another type of related art storage device (e.g., a DRAM-less SSD or a DRAM-less memory card) stores the entire map data in a nonvolatile memory (e.g., a NAND flash memory) included in the related art storage device and loads and uses a portion of the map data onto an SRAM buffer. In this case, to load the map data, the access to the nonvolatile memory whose operating speed is lower than that of the DRAM buffer is frequently performed, thereby reducing the performance of operation.

In contrast, the CXL storage 210 according to some embodiments may not include a separate DRAM buffer configured to store the map data. In this case, map data MD may be stored and managed in the CXL memory 220 placed outside the CXL storage 210. As will be described below, because the CXL memory 220 supports a fast operating speed, the CXL storage 210 may have the same performance as the related art storage device (e.g., a storage device including a DRAM). In addition, because the CXL memory 220 is placed outside the CXL storage 210, it may be easy to cope with a large amount of map data of the CXL storage 210.

The CXL storage 210 may include the CXL storage controller 211 and the nonvolatile memory NVM. The CXL storage controller 211 may include a first CXL storage interface (I/F) circuit 211a, a processor 211b, a RAM 211c, a flash translation layer (FTL) 211d, an error correction code (ECC) engine 211e, a NAND interface (I/F) circuit 211f, and a second CXL storage interface (I/F) circuit 211g.

The first CXL storage interface circuit 211a may be connected with the host 201. The first CXL storage interface circuit 211a may include a first port PT1. The first CXL storage interface circuit 211a may send and receive information, such as a request, data, a response, or a signal, to and from the host 201 through the first port PT1. The first port PT1 may be a circuit or a physical layer configured to send and receive a physical signal complying with the CXL or PCIe protocol. The first CXL storage interface circuit 211a may communicate with the host 201 through the first interface IF1.

The second CXL storage interface circuit 211g may be connected with the CXL memory 220. The second CXL storage interface circuit 211g may include a second port PT2. The second port PT2 may be a dedicated port for the communication of the CXL memory 220. The second CXL storage interface circuit 211g may send and receive information, such as a request, data, a response, or a signal, to and from the CXL memory 220 through the second port PT2. The second port PT2 may be a circuit or a physical layer configured to send and receive a physical signal complying with the CXL or PCIe protocol. The second CXL storage interface circuit 211g may communicate with the CXL memory 220 through the second interface IF2.

The processor 211b may be configured to control an overall operation of the CXL storage controller 211. The RAM 211c may be used as a working memory or a buffer memory of the CXL storage controller 211. In an embodiment, the RAM 211c may be an SRAM and may be used as a read buffer and a write buffer for the CXL storage 210. In an embodiment, as will be described below, the RAM 211c may be configured to temporarily store the map data MD read from the CXL memory 220 or a portion of the map data MD.

The FTL 211d may perform various management operations for efficiently using the nonvolatile memory NVM. For example, the FTL 211d may perform address translation between a logical block address managed by the host 201 and a physical block address used in the nonvolatile memory NVM, based on map data (or a mapping table). The FTL 211d may perform a bad block management operation for the nonvolatile memory NVM. The FTL 211d may perform a wear leveling operation for the nonvolatile memory NVM. The FTL 211d may perform a garbage collection operation for the nonvolatile memory NVM.

In an embodiment, the FTL 211d may be implemented in the form of hardware, firmware, or software, or in the form of a combination thereof. In the case where the FTL 211d is implemented in the form of firmware or software, program codes associated with the FTL 211d may be stored in the RAM 211c and may be driven by the processor 211b. In the case where the FTL 211d is implemented by hardware, hardware components configured to perform the above management operations may be implemented in the CXL storage controller 211.

The ECC engine 211e may perform error detection and correction on data read from the nonvolatile memory NVM. For example, the ECC engine 211e may generate parity bits for user data UD to be stored in the nonvolatile memory NVM, and the parity bits thus generated may be stored in the nonvolatile memory NVM together with the user data UD. When the user data UD are read from the nonvolatile memory NVM, the ECC engine 211e may detect and correct an error of the user data UD by using the parity bits read from the nonvolatile memory NVM together with the user data UD.

The NAND interface circuit 211f may control the nonvolatile memory NVM such that data are stored in the nonvolatile memory NVM or data are read from the nonvolatile memory NVM. In an embodiment, the NAND interface circuit 211f may be implemented to comply with the standard protocol such as a toggle interface or ONFI. For example, the nonvolatile memory NVM may include a plurality of NAND flash devices; in the case where the NAND interface circuit 211f is implemented based on the toggle interface, the NAND interface circuit 211f communicates with the plurality of NAND flash devices through a plurality of channels. The plurality of NAND flash devices may be connected with the plurality of channels through a multi-channel, multi-way structure.

The NAND interface circuit 211f may send a chip enable signal /CE, a command latch enable signal CLE, an address latch enable signal ALE, a read enable signal /RE and a write enable signal /WE to the plurality of NAND flash devices through the plurality of channels. The NAND interface circuit 211f and each NAND flash device may exchange a data signal DQ and a data strobe signal DQS through each channel.

TABLE 1

| /CE | CLE | ALE | /WE | /RE | DQS | DQx | MODE |
|-----|-----|-----|-----|-----|-----|-----|------|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 shows operating modes of a NAND flash device according to a state of each signal. Referring to Table 1, while the NAND flash device receives a command CMD or an address ADDR or receives/outputs data "DATA", the chip enable signal /CE maintains a low state "L". During a command input mode, the NAND interface circuit 211*f* may control signal lines such that the command latch enable signal CLE has a high level "H", the address latch enable signal ALE has the low level "L", the write enable signal /WE toggles between the high level "H" and the low level "L" and the read enable signal /RE has the high level "H". During the command input mode, the NAND interface circuit 211*f* may send the command CMD to the NAND flash device through data signals DQx in synchronization with the rising edge ↑ of the write enable signal /WE. The NAND flash device may identify the command CMD from the data signals DQx in response to the rising edge ↑ of the write enable signal /WE. During an address input mode, the NAND interface circuit 211*f* may control signal lines such that the command latch enable signal CLE has the low level "L", the address latch enable signal ALE has the high level "H", the write enable signal /WE toggles between the high level "H" and the low level "L", and the read enable signal /RE has the high level "H". During the address input mode, the NAND interface circuit 211*f* may send the address ADDR to the NAND flash device through the data signals DQx in synchronization with the rising edge ↑ of the write enable signal /WE. The NAND flash device may identify the address ADDR from the data signals DQx in response to the rising edge ↑ of the write enable signal /WE. In an embodiment, the address ADDR may be a value corresponding to a physical block address of the NAND flash device.

During a data input mode, the NAND interface circuit 211*f* may control signal lines such that the command latch enable signal CLE has the low level "L", the address latch enable signal ALE has the low level "L", the write enable signal /WE has the high level "H", the read enable signal /RE has the high level "H", and the data strobe signal DQS toggles between the high level "H" and the low level "L". During the data input mode, the NAND interface circuit 211*f* may send the data "DATA" to the NAND flash device through the data signals DQx in synchronization with the rising edge ↑ and the falling edge ↓ of the data strobe signal DQS. The NAND flash device may identify the data "DATA" from the data signals DQx in response to the rising edge ↑ and the falling edge ↓ of the data strobe signal DQS.

During a data output mode, the NAND interface circuit 211*f* may control signal lines that the command latch enable signal CLE has the low level "L", the address latch enable signal ALE has the low level "L", the write enable signal /WE has the high level "H", and the read enable signal /RE toggles between the high level "H" and the low level "L". During the data output mode, the NAND flash device may generate the data strobe signal DQS toggling between the high level "H" and the low level "L" in response to the read enable signal /RE. The NAND flash device may send the data "DATA" to the NAND interface circuit 211*f* through the data signals DQx in synchronization with the rising edge ↑ and the falling edge ↓ of the data strobe signal DQS. The NAND interface circuit 211*f* may identify the data "DATA" from the data signals DQx in response to the rising edge ↑ and the falling edge ↓ of the data strobe signal DQS.

The toggle interface described above is an example, and the present disclosure is not limited thereto.

The nonvolatile memory NVM may store or output the user data UD under control of the CXL storage controller 211. The nonvolatile memory NVM may store or output the map data MD under control of the CXL storage controller 211. In an embodiment, the map data MD stored in the nonvolatile memory NVM may include mapping information corresponding to the entire user data UD stored in the nonvolatile memory NVM. The map data MD present in the nonvolatile memory NVM may be stored in the CXL memory 220 in the initialization operation of the CXL storage 210.

The CXL storage 210 may perform the direct communication with the CXL memory 220. The CXL storage 210 may send and receive information, such as a request, data, a response, or a signal, through the second port PT2. For example, the CXL storage 210 and the CXL memory 220 may be directly connected without using an intermediate device such as a switch or a router.

The CXL memory 220 may include the CXL memory controller 221 and the buffer memory BFM. The CXL memory controller 221 may include a CXL memory interface (I/F) circuit 221*a*, a processor 221*b*, a memory manager 221*c*, and a buffer memory interface (I/F) circuit 221*d*.

The CXL memory interface circuit 221*a* may be connected with the CXL storage 210. The CXL memory interface circuit 221*a* may include a fourth port PT4. The CXL memory interface circuit 221*a* may send and receive information, such as a request, data, a response, or a signal, to and from the CXL storage 210 through the fourth port PT4. The fourth port PT4 may be a circuit or a physical layer configured to send and receive a physical signal complying with the CXL or PCIe protocol.

The CXL memory interface circuit 221*a* may perform the direct communication with the CXL storage 210. The CXL memory interface circuit 221*a* may communicate with the CXL storage 210 through the second interface IF2. The CXL memory interface circuit 221*a* may not communicate with any other devices of the computing system 200 other than the CXL storage 210. For example, the CXL memory interface circuit 221*a* may not communicate with the host 201.

The processor 221*b* may be configured to control an overall operation of the CXL memory controller 221. The memory manager 221*c* may be configured to manage the buffer memory BFM. For example, the memory manager 221*c* may be configured to translate a memory address (e.g., a logical address or a virtual address) from the CXL storage 210 into a physical address for the buffer memory BFM. In an embodiment, the memory address that is an address for managing a storage area of the CXL memory 220 may be a logical address or a virtual address that is designated and managed by the CXL storage 210.

The buffer memory interface circuit 221*d* may control the buffer memory BFM such that data are stored in the buffer memory BFM or data are read from the buffer memory BFM. In an embodiment, the buffer memory interface circuit 221*d* may be implemented to comply with the standard protocol such as a DDR interface or an LPDDR interface.

Under control of the CXL memory controller 221, the buffer memory BFM may store data or may output the stored data. In an embodiment, the buffer memory BFM may be configured to store the map data MD that are used in the CXL storage 210. The map data MD may be transferred from the CXL storage 210 to the CXL memory 220 when the computing system 200 is initialized or the CXL storage 210 is initialized.

The CXL memory 220 may be controlled or managed by the CXL storage 210. For example, the CXL storage 210 may operate as a master device with regard to the CXL memory 220, and the CXL memory 220 may operate as a slave device.

As described above, the CXL storage 210 according to some embodiments may store the map data MD, which are used to manage the nonvolatile memory NVM, in the CXL memory 220 directly connected therewith. Afterwards, when the CXL storage 210 performs the read operation depending on a request of the host 201, the CXL storage 210 may read at least a portion of the map data MD from the CXL memory 220 through the second interface IF2 and may perform the read operation based on the at least a portion of the map data MD thus read. In some embodiments, when the CXL storage 210 performs the write operation depending on a request of the host 201, the CXL storage 210 may perform the write operation on the nonvolatile memory NVM and may update the map data MD. In this case, the updated map data MD may be first stored in the RAM 211c of the CXL storage controller 211, and the map data MD stored in the RAM 211c may be transferred to the buffer memory BFM of the CXL memory 220 through the second interface IF2.

In an embodiment, at least a partial area or the entire area of the buffer memory BFM in the CXL memory 220 may be allocated for a dedicated area of the CXL storage 210. The entire area of the CXL memory 220 may be an area that is incapable of being accessed by the host 201.

In an embodiment, the host 201 and the CXL storage 210 may communicate with each other by using CXL.io being an input/output protocol. The CXL.io may have a PCIe-based non-coherency input/output protocol. The host 201 and the CXL storage 210 may exchange user data or variety of information with each other by using the CXL.io.

In an embodiment, the CXL storage 210 and the CXL memory 220 may communicate with each other by using CXL.mem being a memory access protocol or CXL.io. The CXL.mem may be a memory access protocol that supports memory access. The CXL storage 210 may access a partial area (e.g., an area where the map data MD are stored or a CXL storage-dedicated area) of the CXL memory 220 by using the CXL.mem or CXL.io. The above access types including CXL.io and CXL.mem are provided as an example, and the present disclosure is not limited thereto.

In an embodiment, the CXL storage 210 and the CXL memory 220 may be installed in a CXL interface-based physical port (e.g., a PCIe physical port). In an embodiment, the CXL storage 210 and the CXL memory 220 may be implemented based on the E1.S, E1.L, E3.S, E3.L, or PCIe AIC (CEM) form factor. In some embodiments, the CXL storage 210 and the CXL memory 220 may be implemented based on the U.2 form factor, the M.2 form factor, various different types of PCIe-based form factors, or various different types of small form factors. The CXL storage 210 and the CXL memory 220 may be implemented with various types of form factors, and may support a function of a hot-plug capable of being installed in (or added to) or removed from the physical port.

As described above, the CXL storage 210 may include the first port PT1 and the second port PT2. That is, the CXL storage 210 may have a multi-port. The CXL storage 210 may communicate with the CXL memory 220 through the second port PT2. The CXL storage 210 and the CXL memory 220 may be connected by using the CXL Direct. The CXL storage 210 and the CXL memory 220 may improve performance by using a CXL-dedicated lane (or an exclusive link).

Figure 4:
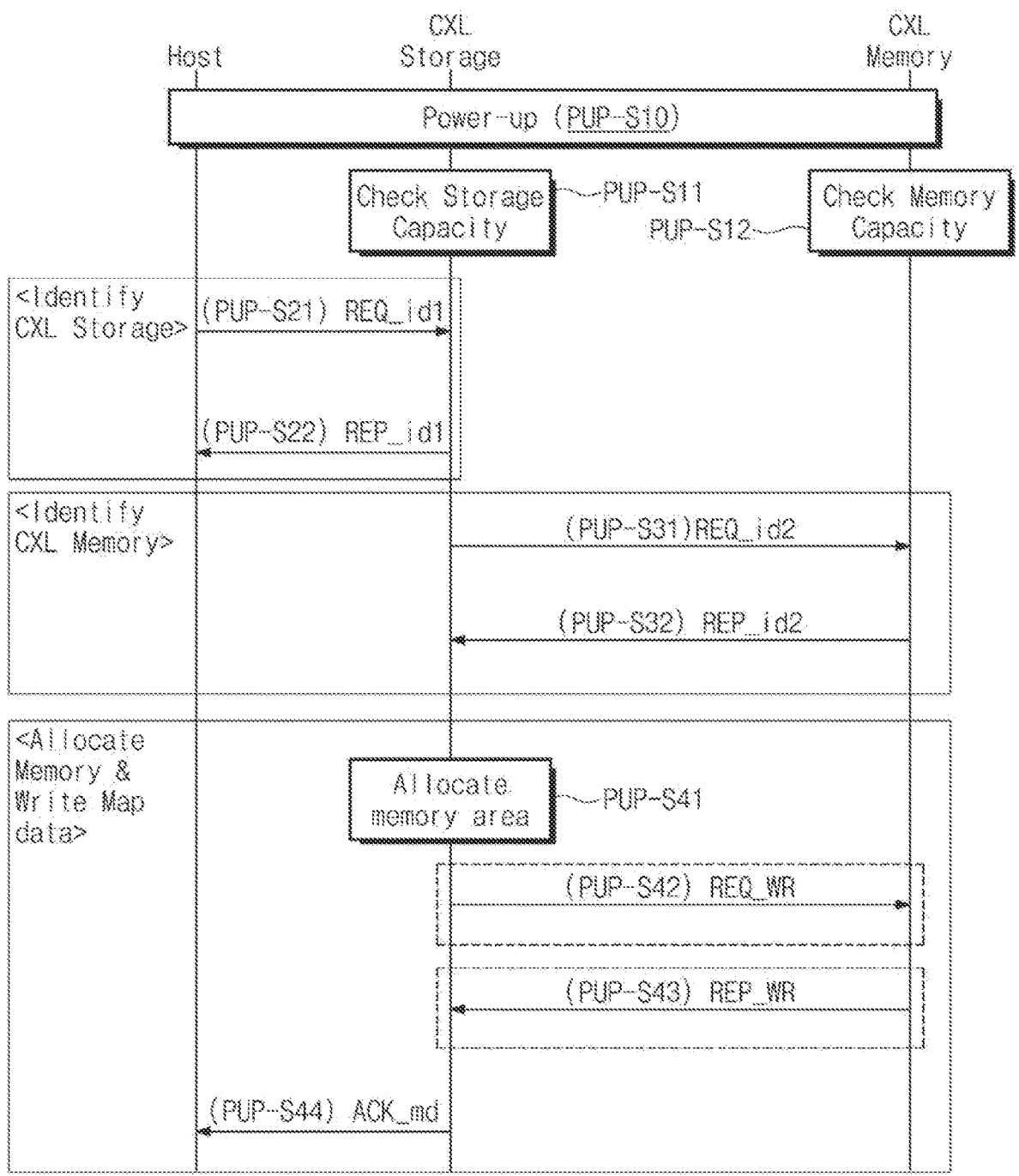
FIG. 4 is a flowchart illustrating an initialization operation or a power-up operation of a computing system of FIG. 3B, according to some embodiments.

FIG. 4 is a flowchart illustrating an initialization operation or a power-up operation of a computing system of FIG. 3B, according to some embodiments. Referring to FIGS. 3B and 4, in operation PUP-S10, the computing system 200 may be powered up. When the computing system 200 is powered up, the host 201 may send information about power-up or initialization start to the CXL storage 210. The CXL storage 210 may perform the initialization operation in response to the power-up or initialization start information. The CXL storage 210 may send the power-up or initialization start information to the CXL memory 220. The CXL memory 220 may perform the initialization operation in response to the power-up or initialization start information.

In operation PUP-S11, the CXL storage 210 may check a storage capacity (i.e., a capacity of the nonvolatile memory NVM). For example, the CXL storage 210 may check the storage capacity of the nonvolatile memory NVM in response to the information about power-up or initialization start.

In operation PUP-S12, the CXL memory 220 may check a memory capacity (i.e., a capacity of the buffer memory BFM). For example, the CXL memory 220 may check the capacity of the buffer memory BFM in response to the power-up or initialization start information.

The host 201 may recognize information of the CXL storage 210 through operation PUP-S21 and operation PUP-S22. For example, in operation PUP-S21, the host 201 may issue a first device information request REQ_id1 for recognizing device information of the CXL storage 210 through the CXL host interface circuit 201a (or the third port PT3). The host 201 may send the first device information request REQ_id1 to the CXL storage 210. The host 201 may send the first device information request REQ_id1 to the CXL storage 210 through the first interface IF1. The CXL storage 210 may receive the first device information request REQ_id1 through the first port PT1 (or the first CXL storage interface circuit 211a).

In operation PUP-S22, the CXL storage 210 may output a first device information response REP_id1 through the first CXL storage interface circuit 211a (or the first port PT1) in response to the first device information request REQ_id1 thus received. The CXL storage 210 may send the first device information response REP_id1 to the host 201. The host 201 may receive the first device information response REP_id1 through the first interface IF1.

The host 201 may identify the device information of the CXL storage 210 in response to the first device information response REP_id1 thus received. In an embodiment, the first device information response REP_id1 may include information about a device type and a storage capacity of the CXL storage 210.

The CXL storage 210 may recognize information of the CXL memory 220 through operation PUP-S31 and operation PUP-S32. For example, in operation PUP-S31, the CXL storage 210 may issue a second device information request REQ_id2 for recognizing the device information of the CXL memory 220 through the second CXL storage interface circuit 211g (or the second port PT2). The CXL storage 210 may send the second device information request REQ_id2 to the CXL memory 220. The CXL storage 210 may send the second device information request REQ_id2 to the CXL memory 220 through the second interface IF2. The CXL memory 220 may receive the second device information request REQ_id2 through the fourth port PT4 (or the CXL memory interface circuit 221a).

In operation PUP-S32, the CXL memory 220 may output a second device information response REP_id2 through the CXL memory interface circuit 221a in response to the second device information request REQ_id2 thus received. The CXL memory 220 may send the second device information response REP_id2 to the CXL storage 210 through the second interface IF2. The CXL storage 210 may receive the second device information response REP_id2 through the second CXL storage interface circuit 211g (or the second port PT2).

The CXL storage 210 may identify the device information of the CXL memory 220 in response to the second device information response REP_id2 thus received. In an embodiment, the second device information response REP_id2 may include information about a device type and a storage capacity of the CXL memory 220.

As described above, the host 201 may identify the information about the device type (e.g., whether it is storage) of the CXL storage 210 through operation PUP-S21 and operation PUP-S22. The CXL storage 210 may identify the information about the device type (e.g., whether it is a memory) and the capacity of the CXL memory 220 through operation PUP-S31 and operation PUP-S32. That is, the host 201 may recognize only the CXL storage 210 and may not recognize the CXL memory 220. The CXL memory 220 may not directly communicate with the host 201. The CXL memory 220 may be a device that is independent of the host 201.

In some embodiments, the CXL storage 210 may allocate at least a partial area of the CXL memory 220 for an area dedicated for the CXL storage 210 through operation PUP-S41 to operation PUP-S44. In some embodiments, the entire area of the CXL memory 220 may be allocated for a dedicated area of the CXL storage 210. For example, in operation PUP-S41, the CXL storage 210 may determine a buffer capacity based on the storage capacity of the CXL storage 210. In some embodiments, the CXL storage 210 may determine a buffer capacity based on the storage capacity of the CXL storage 210 or the memory capacity of the CXL memory 220. The CXL storage 210 may allocate the area of the CXL memory 220, which corresponds to the determined buffer capacity, for the dedicated area of the CXL storage 210. The CXL storage 210 may determine a memory address area of the CXL memory 220.

The CXL storage 210 may store information about a memory address (e.g., a logical address range or a virtual address range) of an area allocated for the dedicated area of the CXL storage 210. The CXL storage 210 may identify the area of the CXL memory 220, which is dedicated for the CXL storage 210.

In operation PUP-S42, the CXL storage 210 may output a write request REQ_WR through the second CXL storage interface circuit 211g (or the second port PT2). The CXL storage 210 may send the write request REQ_WR to the CXL memory 220 through the second interface IF2. The CXL memory 220 may perform the write operation in response to the write request REQ_WR.

In operation PUP-S43, the CXL memory 220 may output, through the CXL memory interface circuit 221a (or the fourth port PT4), a write response REP_WR providing notification that the write request is completed. The CXL memory 220 may send the write response REP_WR to the CXL storage 210 through the second interface IF2. The CXL storage 210 may receive the write response REP_WR and may recognize that the write operation is completely performed on the CXL memory 220, in response to the write response REP_WR.

In an embodiment, the write request REQ_WR may refer to a request for storing the map data MD present in the nonvolatile memory NVM of the CXL storage 210 in the dedicated area of the CXL memory 220. That is, the write request REQ_WR may include address information about the map data MD and the dedicated area. Through operation PUP-S42 and operation PUP-S43, the map data MD present in the CXL storage 210 may be stored in the dedicated area of the CXL memory 220.

In operation PUP-S44, the CXL storage 210 may output acknowledge information ACK_md through the first CXL storage interface circuit 211a (or the first port PT1). The CXL storage 210 may send the acknowledge information ACK_md to the host 201 through the first interface IF1. The host 201 may receive the acknowledge information ACK_md. In response to the acknowledge information ACK_md, the host 201 may recognize that the CXL storage 210 stores the map data MD in the CXL memory 220. In some embodiments, the host 201 may recognize that the CXL storage 210 is ready to perform the normal operation, in response to the acknowledge information ACK_md. Afterwards, the host 201, the CXL storage 210, and the CXL memory 220 may perform a normal operation (e.g., a read operation or a write operation).

Figure 5:
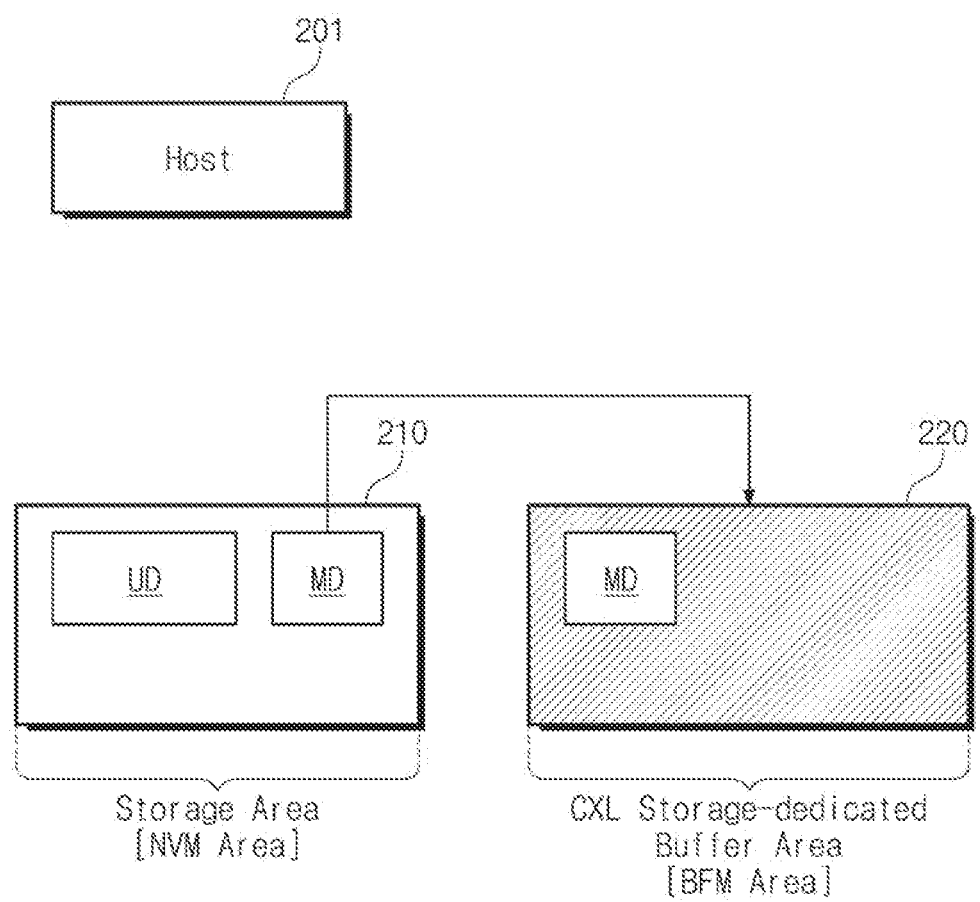
FIG. 5 is a diagram for describing an operation in which a computing system of FIG. 3B stores map data, according to some embodiments.

FIG. 5 is a diagram for describing an operation in which a computing system of FIG. 3B stores map data, according to some embodiments. For convenience of description and for brevity of drawing, components of the host 201, the CXL storage 210, and the CXL memory 220 are conceptually illustrated, and some unnecessary components are omitted.

Referring to FIGS. 3B to 5, the CXL storage 210 may allocate the entire area of the CXL memory 220 for a dedicated area of the CXL storage 210. In this case, the dedicated area of the CXL memory 220 may be accessed by the CXL storage 210 and may be used to store map data of the CXL storage 210.

For example, as illustrated in FIG. 5, the nonvolatile memory NVM of the CXL storage 210 may store the user data UD and the map data MD. As described above, because the CXL storage 210 does not include a separate buffer memory, the CXL storage 210 may require a buffer area in which the map data MD are to be stored. According to some embodiments, the map data MD of the CXL storage 210 may be stored in the area of the CXL memory 220. In this case, the dedicated area of the CXL memory 220 may be accessed by the CXL storage 210 through the second interface IF2.

In an embodiment, the entire area of the CXL memory 220 may be an area that is accessible by the CXL storage 210 or is managed by the CXL storage 210. The entire area of the CXL memory 220 may be an area that is incapable of being accessed by the host 201 or may be an area that is not managed by the host 201. In this case, the CXL storage 210 may access the area of the CXL memory 220 through the second port PT2. The CXL storage 210 may access the area of the CXL memory 220 through the second interface IF2.

Because the CXL memory 220 is directly connected with the CXL storage 210, the host 201 may not access the area of the CXL memory 220 through the first interface IF1. That is, the CXL storage 210 is capable of accessing the CXL memory 220 through the second interface IF2, while the host 201 is incapable of accessing the CXL memory 220.

As described above, the CXL storage 210 may allocate the entire area of the CXL memory 220 for the dedicated area of the CXL storage 210. In this case, the CXL storage 210 performs the access to the area of the CXL memory 220, while the host 201 may not perform the access to the entire area of the CXL memory 220. In an embodiment, the access of the CXL storage 210 to the CXL memory 220 may be performed through the second interface IF2.

Figure 6:
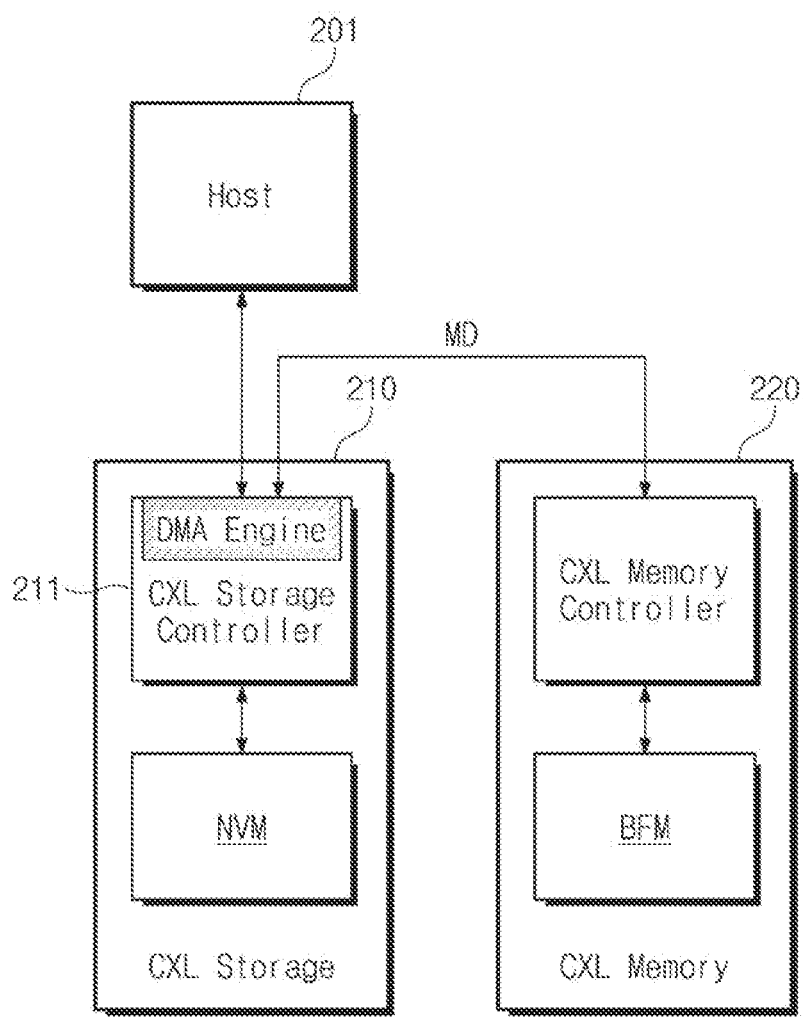
FIG. 6 is a diagram for describing an operation in which map data are stored in a CXL memory, according to some embodiments.

FIG. 6 is a diagram for describing an operation in which map data are stored in a CXL memory, according to some embodiments. In an embodiment, the map data MD present in the CXL storage 210 may be transferred and stored to the CXL memory 220 from the CXL storage 210 through various manners.

As an example, the CXL storage 210 and the CXL memory 220 may exchange the map data MD based on a peer-to-peer (P2P) manner. For example, as illustrated in FIG. 6, the CXL storage controller 211 of the CXL storage 210 may include a direct memory access (DMA) engine. The DMA engine included in the CXL storage controller 211 may transfer the map data MD present in the nonvolatile memory NVM to the CXL memory 220 without the interference or control of the host 201. That is, the map data MD may be transferred from the CXL storage 210 to the CXL memory 220 based on the P2P manner.

The above manners in which map data are transferred from the CXL storage 210 to the CXL memory 220 are provided as an example, and the present disclosure is not limited thereto. It may be understood that the transfer of map data from the CXL storage 210 to the CXL memory 220 may be implemented in various manners using the second interface IF2. In an embodiment, the transfer (i.e., the backup or flush) of map data from the CXL memory 220 to the CXL storage 210 may also be implemented in a manner similar to the above manners.

Figure 7:
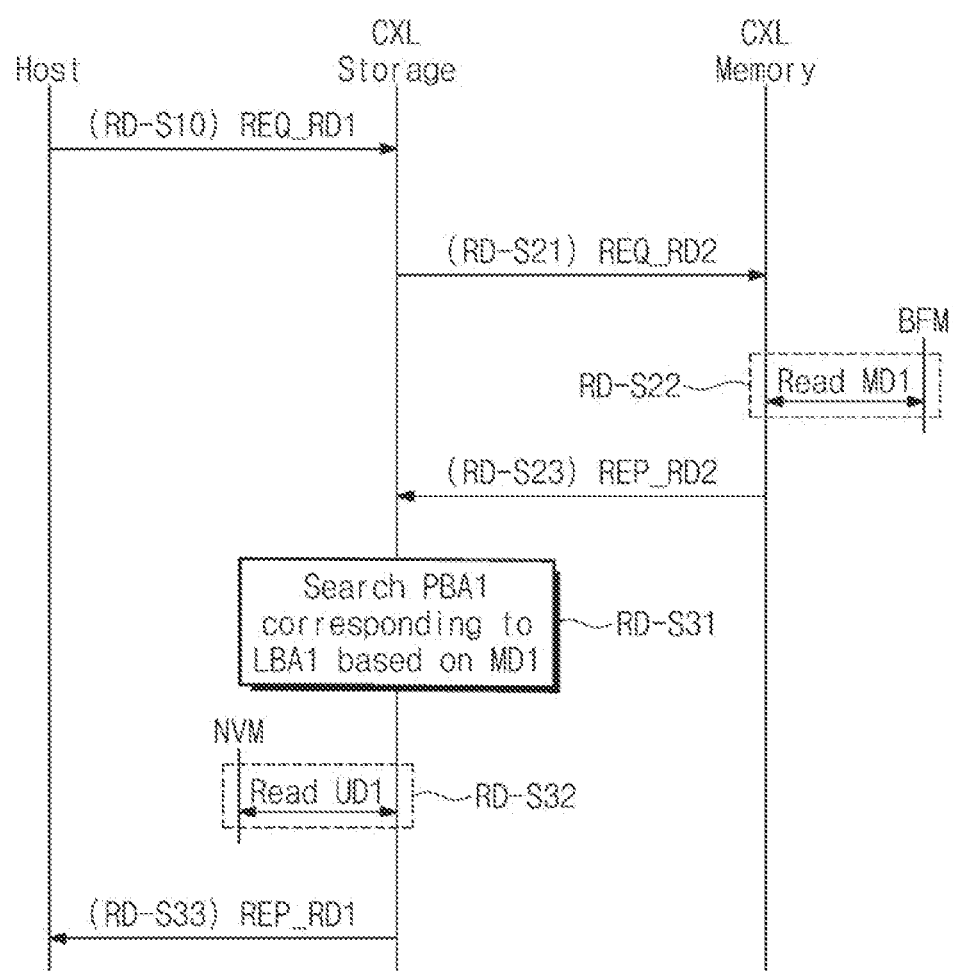
FIG. 7 is a flowchart illustrating a read operation for CXL storage of FIG. 3A, according to some embodiments.

FIG. 7 is a flowchart illustrating a read operation for CXL storage of FIG. 3A, according to some embodiments. In an embodiment, the read operation for the CXL storage 210 according to the flowchart of FIG. 7 may be performed after the initialization operation of FIG. 4 is performed (i.e., after the map data MD of the CXL storage 210 are stored in the area of the CXL memory 220).

Referring to FIGS. 3A, 3B, and 7, in operation RD-S10, the host 201 may output a first read request REQ_RD1 through the CXL host interface circuit 201a. The host 201 may send the first read request REQ_RD1 to the CXL storage 210 through the first interface IF1. In an embodiment, the first read request REQ_RD1 may refer to a request for reading first user data UD1 stored in the CXL storage 210 and may include a first logical block address LBA1 corresponding to the first user data UD1. The CXL storage 210 may receive the first read request REQ_RD1 through the first CXL storage interface circuit 211a (or the first port PT1).

In operation RD-S21, the CXL storage 210 may output a second read request REQ_RD2 through the second CXL storage interface circuit 211g (or the second port PT2) in response to the first read request REQ_RD1. The CXL storage 210 may send the second read request REQ_RD2 to the CXL memory 220 through the second interface IF2. In an embodiment, the second read request REQ_RD2 may refer to a request for reading first map data MD1 corresponding to the first logical block address LBA1. That is, the second read request REQ_RD2 may refer to a request for reading the first map data MD1 from the CXL memory 220. The second read request REQ_RD2 may include information about a memory address (e.g., a logical address or a virtual address) of the CXL memory 220, which indicates an area where the first map data MD1 are stored.

In operation RD-S22, the CXL memory 220 may read the first map data MD1 in response to the second read request REQ_RD2. For example, the CXL memory controller 221 of the CXL memory 220 may read the first map data MD1 from the area corresponding to the memory address (e.g., a logical address or a virtual address) included in the second read request REQ_RD2. In an embodiment, the CXL memory controller 221 may read the first map data MD1 from the buffer memory BFM by using the buffer memory interface circuit 221d.

In an embodiment, the first map data MD1 read in operation RD-S22 may be a portion of the entire map data MD and may be map data corresponding to the first logical block address LBA1. That is, the first map data MD1 may include information about a first physical block address PBA1 corresponding to the first logical block address LBA1.

In operation RD-S23, the CXL memory 220 may output a second read response REP_RD2 including the first map data MD1 through the CXL memory interface circuit 221a. The CXL memory 220 may send the second read response REP_RD2 to the CXL storage 210 through the second interface IF2. The CXL storage 210 may receive the second read response REP_RD2 through the second CXL storage interface circuit 211g (or the second port PT2). In an embodiment, the first map data MD1 included in the second read response REP_RD2 thus received may be stored or temporarily stored in the RAM 211c of the CXL storage controller 211.

In an embodiment, when the first map data MD1 corresponding to the first logical block address LBA1 is already present in the RAM 211c of the CXL storage controller 211, operation RD-S21 to operation RD-S23 (i.e., operations for loading the first map data MD1 from the CXL memory 220) may be omitted.

In operation RD-S31, the CXL storage 210 may search for the first physical block address PBA1 corresponding the first logical block address LBA1 based on the first map data MD1. For example, the FTL 211d of the CXL storage controller 211 may search for the first physical block address PBA1 corresponding to the first logical block address LBA1 based on the first map data MD1.

In operation RD-S32, the CXL storage 210 may read the first user data UD1 present in an area corresponding to the first physical block address PBA1 from the nonvolatile memory NVM. For example, the CXL storage controller 211 may read the first user data UD1 from the area of the nonvolatile memory NVM, which corresponds to the first physical block address PBA1. In an embodiment, the CXL storage controller 211 may read the first user data UD1 from the nonvolatile memory NVM by using the NAND interface circuit 211f.

In operation RD-S33, the CXL storage 210 may output a first read response REP_RD1 to the first read request REQ_RD1 through the first CXL storage interface circuit 211a (or the first port PT1). The CXL storage 210 may send the first read response REP_RD1 to the host 201 through the first interface IF1. The host 201 may receive the first read response REP_RD1. In an embodiment, the first read response REP_RD1 may include the first user data UD1 requested through the first read request REQ_RD1. The host 201 may obtain the first user data UD1 through the first read response REP_RD1.

In an embodiment, operation RD-S10 and operation RD-S33 corresponding to the communications between the host 201 and the CXL storage 210 may be performed based on the CXL.io, and operation RD-S21 and operation RD-S23 corresponding to the communications between the CXL storage 210 and the CXL memory 220 may be performed based on the CXL.mem. However, the present disclosure is not limited thereto. For example, the communications between the CXL storage 210 and the CXL memory 220 and the communications between the host 201 and the CXL storage 210 may be performed independently of each other. That is, the communications between the host 201, the CXL storage 210, and the CXL memory 220 may not be performed through the common interface (or a common link or a common switch).

Figure 8:
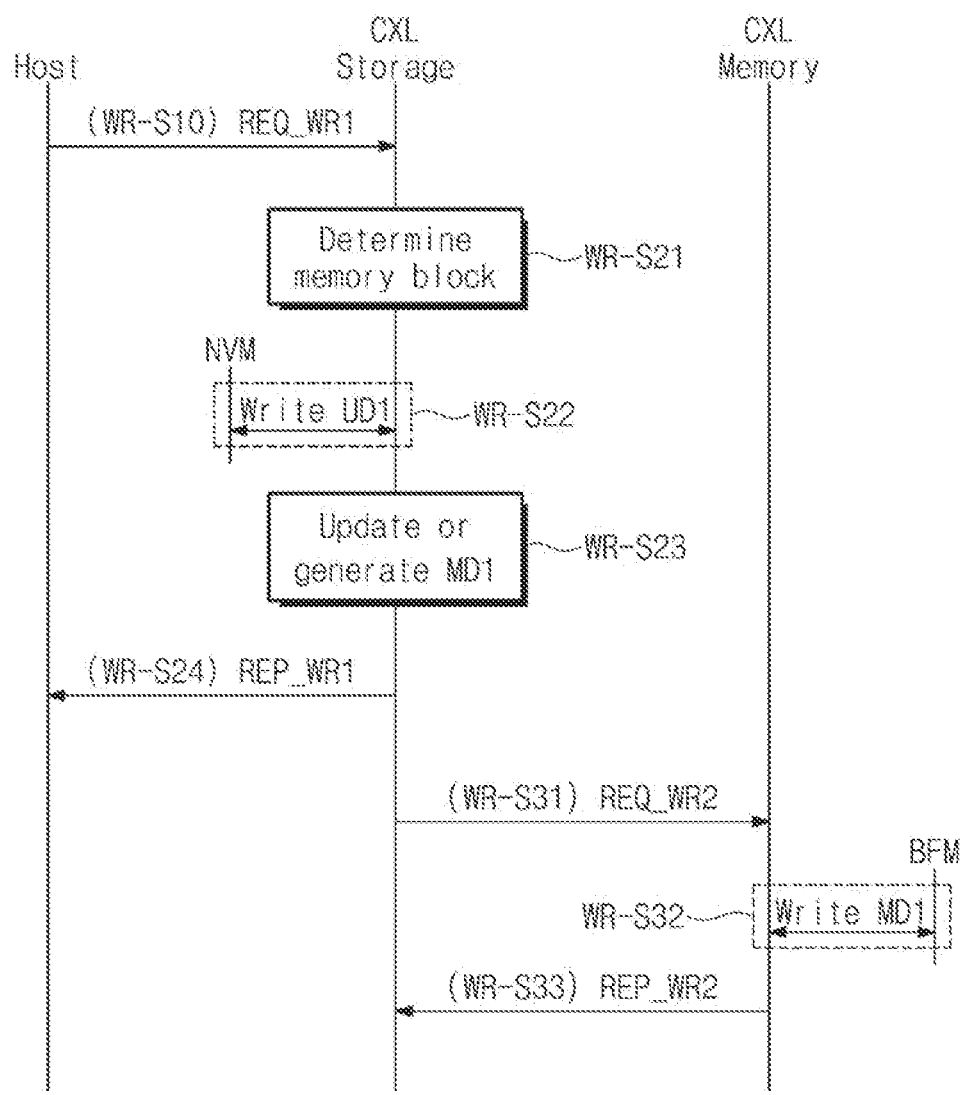
FIG. 8 is a flowchart illustrating a write operation for CXL storage of FIG. 3A, according to some embodiments.

FIG. 8 is a flowchart illustrating a write operation for CXL storage of FIG. 3A, according to some embodiments. In an embodiment, the write operation for the CXL storage 210 according to the flowchart of FIG. 8 may be performed after the initialization operation of FIG. 4 is performed (i.e., after the map data MD of the CXL storage 210 are stored in the dedicated area of the CXL memory 220).

Referring to FIGS. 3A, 3B, and 8, in operation WR-S10, the host 201 may output a first write request REQ_WR1 through the CXL host interface circuit 201a. The host 201 may send the first write request REQ_WR1 to the CXL storage 210 through the first interface IF1. The CXL storage 210 may receive the first write request REQ_WR1 through the first CXL storage interface circuit 211a (or the first port PT1). In an embodiment, the first write request REQ_WR1 may refer to a request for writing the first user data UD1 in the CXL storage 210.

In operation WR-S21, the CXL storage 210 may determine a memory block in which the first user data UD1 are to be written, in response to the first write request REQ_WR1. For example, the FTL 211d of the CXL storage controller 211 may manage block information about a memory block, which is free, capable of being written, or capable of being allocated, from among memory blocks included in the nonvolatile memory NVM. The FTL 211d may select a memory block, in which the first user data UD1 are to be written, based on the block information.

In operation WR-S22, the CXL storage 210 may write the first user data UD1 in the selected memory block. For example, the CXL storage controller 211 may control the nonvolatile memory NVM such that the first user data UD1 are written in the selected memory block. In an embodiment, the CXL storage controller 211 may write the first user data UD1 in the nonvolatile memory NVM by using the NAND interface circuit 211f.

When the first user data UD1 are completely written in the nonvolatile memory NVM (i.e., when a program operation for the nonvolatile memory NVM is passed), in operation WR-S23, the CXL storage 210 may update the first map data MD1 or may generate the first map data MD1. For example, the first map data MD1 may include information indicating that the first user data UD1 corresponding to the first logical block address LBA1 are stored in an area of the nonvolatile memory NVM, which corresponds to the first physical block address PBA1. That is, the CXL storage 210 may generate the first map data MD1 indicating that the first user data UD1 corresponding to the first logical block address LBA1 are stored in the area corresponding to the first physical block address PBA1.

In operation WR-S24, the CXL storage 210 may send the first write response REP_WR1 to the first write request REQ_WR1 through the first CXL storage interface circuit 211a (or the first port PT1). The CXL storage 210 may send the first write response REP_WR1 to the host 201 through the first interface IF1. The host 201 may receive the first write response REP_WR1. In response to the first write response REP_WR1, the host 201 may determine that the first user data UD1 corresponding to the first write request REQ_WR1 are normally stored in the CXL storage 210.

After the write operation for the CXL storage 210 requested by the host 201 is completed, the CXL storage 210 may perform a map data update operation. For example, in operation WR-S31, the CXL storage 210 may output a second write request REQ_WR2 through the second CXL storage interface circuit 211g (or the second port PT2). The CXL storage 210 may send the second write request REQ_WR2 to the CXL memory 220 through the second interface IF2.

In an embodiment, the second write request REQ_WR2 may refer to a request for writing the first map data MD1, which are updated or generated as the first user data UD1 are stored, in the CXL memory 220. The second write request REQ_WR2 may include a memory address at which the first map data MD1 are to be stored. The memory address included in the second write request REQ_WR2 may indicate the area of the CXL memory 220, which is dedicated for the CXL storage 210.

In operation WR-S32, the CXL memory 220 may store the first map data MD1 in the corresponding area in response to the second write request REQ_WR2. For example, the CXL memory 220 may write the first map data MD1 in the area corresponding to the memory address included in the second write request REQ_WR2.

In operation WR-S33, the CXL memory 220 may output a second write response REP_WR2 to the second write request REQ_WR2 through the CXL memory interface circuit 221a. The CXL memory 220 may send the second write response REP_WR2 to the CXL storage 210 through the second interface IF2. The CXL storage 210 may receive the second write response REP_WR2 through the second CXL storage interface circuit 211g (or the second port PT2).

In an embodiment, operation WR-S31 to operation WR-S33 (i.e., an operation of storing map data in the CXL memory 220 or an operation of updating map data) may be performed whenever the write operation for the CXL storage 210 is completed. In some embodiments, operation WR-S31 to operation WR-S33 may be performed when the size of map data updated or newly generated reaches a given value. In some embodiments, operation WR-S31 to operation WR-S33 may be performed periodically. However, the present disclosure is not limited thereto. For example, map data that are generated or updated during the operation of the CXL storage 210 may be stored in the CXL memory 220 depending on various operation policies.

Figure 9:
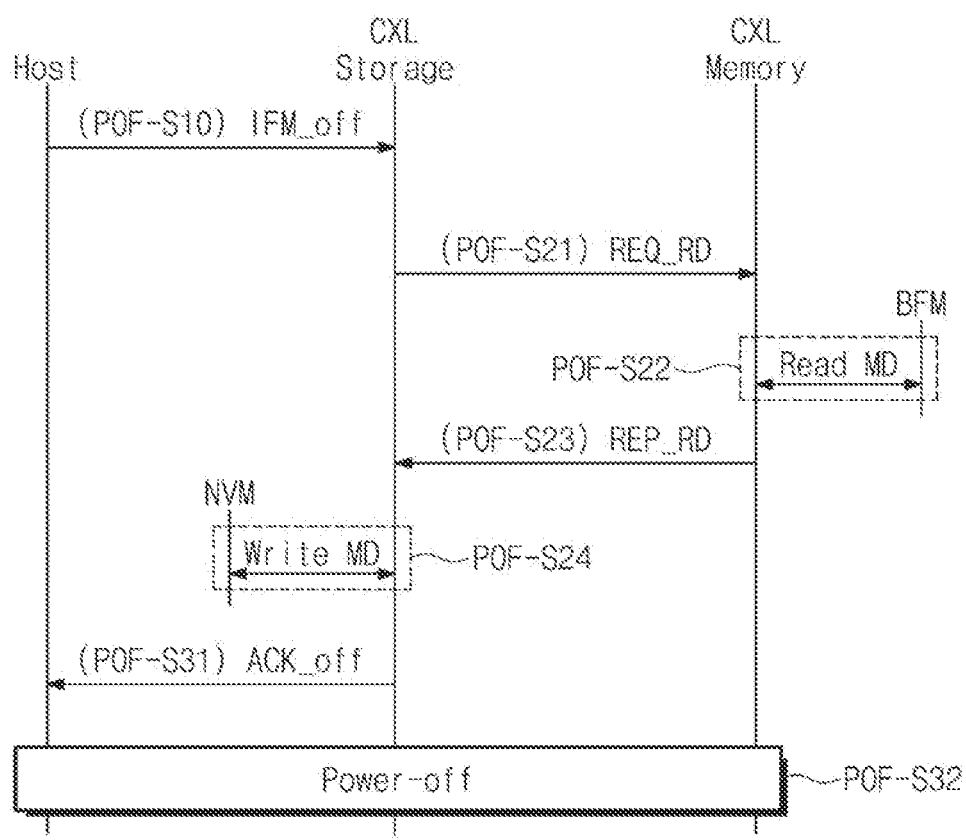
FIG. 9 is a flowchart illustrating a power-off operation of a computing system of FIG. 3A, according to some embodiments.

FIG. 9 is a flowchart illustrating a power-off operation of a computing system of FIG. 3A, according to some embodiments. In an embodiment, a power-off operation of a computing system will be described with reference to FIG. 9, but the present disclosure is not limited thereto. For example, it may be understood that the operating method of FIG. 9 is applicable to the power-off operation or reset operation of each of various components (e.g., a host, CXL storage, a CXL memory, and a CXL switch) included in the computing system.

Referring to FIGS. 3A and 9, in operation POF-S10, the host 201 may output power-off information IFM_off through the CXL host interface circuit 201a. The host 201 may send the power-off information IFM_off to the CXL storage 210 through the first interface IF1. For example, the host 201 may recognize or detect information about power-off of the computing system 100. The CXL storage 210 may receive the power-off information IFM_off, which allows the CXL storage 210 to perform the power-off operation, through the first CXL storage interface circuit 211a (or the first port PT1).

In operation POF-S21, the CXL storage 210 may output a read request REQ_RD through the second CXL storage interface circuit 211g (or the second port PT2) in response to the power-off information IFM_off. The CXL storage 210 may send the read request REQ_RD to the CXL memory 220 through the second interface IF2. The CXL memory 220 may receive the read request REQ_RD. In an embodiment, the read request REQ_RD in operation POF-S21 may refer to a request for reading the entire map data MD stored in the CXL memory 220. The read request REQ_RD may include a memory address of an area where the map data MD are stored.

In operation POF-S22, the CXL memory 220 may read the map data MD in response to the read request REQ_RD. For example, the CXL memory 220 may read the map data MD from the buffer memory BFM based on the memory address included in the read request REQ_RD.

In operation POF-S23, the CXL memory 220 may output a read response REP_RD to the read request REQ_RD through the CXL memory interface circuit 221a. The CXL memory 220 may send the read response REP_RD to the CXL storage 210 through the second interface IF2. The CXL storage 210 may receive the read response REP_RD through the second CXL storage interface circuit 211g (or the second port PT2).

In operation POF-S24, the CXL storage 210 may write the map data MD included in the read response REP_RD in the nonvolatile memory NVM. In an embodiment, the CXL storage 210 may store the map data MD in a given area of the nonvolatile memory NVM.

After the map data MD associated with the CXL storage 210 are stored in the nonvolatile memory NVM, in operation POF-S31, the CXL storage 210 may output a response ACK_off to the power-off information IFM_off through the first CXL storage interface circuit 211a (or the first port PT1). The CXL storage 210 may send the response ACK_off to the host 201 through the first interface IF1. The host 201 may receive the response ACK_off and recognize that the map data MD present in the CXL memory 220 are normally stored in the CXL storage 210, based on the response ACK_off.

Afterwards, in operation POF-S32, the host 201, the CXL storage 210, and the CXL memory 220 may be powered off. For example, a power that is provided to the host 201, the CXL storage 210, and the CXL memory 220 may be interrupted.

The power-off operation described with reference to FIG. 9 is provided as an example, and the present disclosure is not limited thereto. For example, in the embodiment of FIG. 9, after the CXL storage 210 stores the map data MD present in the CXL memory 220 in the nonvolatile memory NVM, the CXL storage 210 may provide notification that the map data MD are completely backed up, by sending the response ACK_off to the host 201 (i.e., an interrupt manner). In some embodiments, the CXL storage 210 may set a value of a specific register to a given value after storing the map data MD present in the CXL memory 220 in the nonvolatile memory NVM. The host 201 may check whether the map data MD are completely backed up, by periodically checking the value of the specific register of the CXL storage 210 (a polling manner). In some embodiments, the CXL storage 210 may be configured to complete a backup operation for the map data MD within a given time from a point in time when the power-off information IFM_off is received from the host 201 (a time-out manner). As described above, the CXL storage 210 may transfer information about backup completion of the map data MD to the host 201 through at least one of various manners.

In an embodiment, the power-off operation may be changed depending on an operation manner of the CXL storage 210. For example, when the CXL storage 210 performs the write operation, the CXL storage 210 may perform the program operation on the nonvolatile memory NVM and thus may update the map data MD.

In an embodiment, the operation of updating the map data MD may be performed only on the CXL memory 220. In this case, the map data MD stored in the CXL memory 220 may be up-to-date information, and the map data MD stored in the nonvolatile memory NVM may not be up-to-date information. That is, when the operation of updating the map data MD is performed only on the CXL memory 220, up-to-date information about the map data MD is maintained only in the CXL memory 220; for this reason, when the CXL storage 210, the CXL memory 220, or the computing system 200 is powered off, an operation of flushing, backing up, or dumping the map data MD from the CXL memory 220 is required. In an embodiment, the map data (MD) update operation may be first performed with respect to the map data MD stored in the nonvolatile memory NVM and may then be performed with respect to the map data MD stored in the CXL memory 220 through the background operation. In this case, because the map data MD stored in the nonvolatile memory NVM are guaranteed to be up-to-date information, the operation of flushing, dumping, or backing up the map data MD from the CXL memory 220 may not be required when the CXL storage 210, the CXL memory 220, or the computing system 200 is powered off.

In an embodiment, the map data update operation may be first performed with respect to the map data MD stored in the CXL memory 220 and may then be performed with respect to the map data MD stored in the nonvolatile memory NVM through the background operation. In this case, the map data MD stored in the CXL memory 220 may be up-to-date information, and the map data MD stored in the nonvolatile memory NVM may not be up-to-date information. As such, when the CXL storage 210, the CXL memory 220, or the computing system 200 is powered off, at least a portion of the map data MD of the CXL memory 220 has to be backed up to the nonvolatile memory NVM of the CXL storage 210. In an embodiment, at least a portion of the map data MD to be backed up to the nonvolatile memory NVM may be the up-to-date map data MD that are not stored in the nonvolatile memory NVM. In an embodiment, the CXL storage 210 may manage or store flag information or table information indicating that the map data MD stored in the nonvolatile memory NVM are up-to-date information.

As described above, when the CXL storage 210, the CXL memory 220, or the computing system 200 is powered off, depending on a way to manage the map data MD (i.e., depending on a place where up-to-date information is managed), the map data MD may be selectively flushed, backed up, or dumped to the CXL storage 210 from the CXL memory 220.

Figure 10:
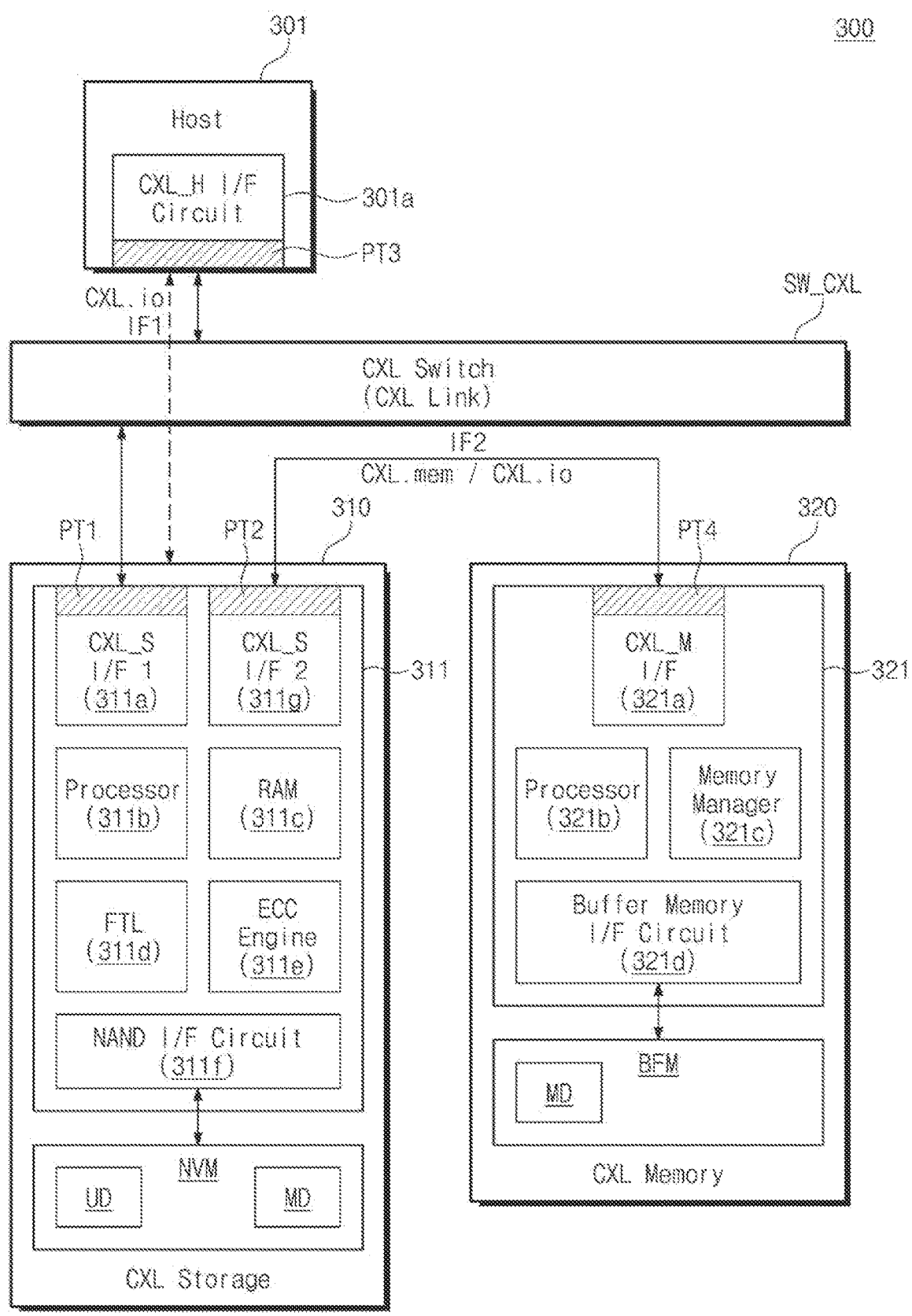
FIG. 10 is a diagram illustrating a computing system to which a storage system according to some embodiments is applied.

FIG. 10 is a diagram illustrating a computing system to which a storage system according to some embodiments is applied. Referring to FIG. 10, a computing system 300 may include the CXL switch SW_CXL, a host 301, CXL storage 310, and a CXL memory 320. The host 301, the CXL storage 310, and the CXL memory 320 illustrated in FIG. 10 are similar or identical to the host 201, the CXL storage 210, and the CXL memory 220 illustrated in FIG. 3B, and thus, repeated description will be omitted to avoid redundancy.

The CXL storage 310 may include a CXL storage controller 311 and the nonvolatile memory NVM. The CXL storage controller 311 and the nonvolatile memory NVM illustrated in FIG. 10 are similar or identical to the CXL storage controller 211 and the nonvolatile memory NVM illustrated in FIG. 3B, and thus, repeated description will be omitted to avoid redundancy.

The CXL memory 320 may include a CXL memory controller 321 and the buffer memory BFM. The CXL memory controller 321 and the buffer memory BFM illustrated in FIG. 10 are similar or identical with the CXL memory controller 221 and the buffer memory BFM illustrated in FIG. 3B, and thus, repeated description will be omitted to avoid redundancy.

In an embodiment, like the embodiment of FIG. 3B, the host 301, the CXL storage 310, and the CXL memory 320 may be configured not to share the same interface. For example, the host 301 and the CXL storage 310 may communicate with each other through the first interface IF1, and the CXL storage 310 and the CXL memory 320 may communicate with each other through the second interface IF2. The first interface IF1 and the second interface IF2 may be physically separated from each other. All the first and second interfaces IF2 and IF2 may be implemented with the CXL interface.

The CXL switch SW_CXL may be a component included in the first interface IF1. The CXL switch SW_CXL may be configured to arbitrate the communications between the host 301 and the CXL storage 310. For example, when the host 301 and the CXL storage 310 communicate with each other, the CXL switch SW_CXL may be configured to send information, which is provided from the host 301 or the CXL storage 310, such as a request, data, a response, or a signal, to the CXL storage 310 or the host 301.

The host 301 may include a CXL host interface (CXL_H I/F) circuit 301a. The CXL host interface circuit 301a may include a third port PT3. The CXL host interface circuit 301a may communicate with the CXL storage 310 through the CXL switch SW_CXL.

The CXL storage 310 may include the CXL storage controller 311 and the nonvolatile memory NVM. The CXL storage controller 311 may include a first CXL storage interface (CXL_S I/F 1) circuit 311a, a processor 311b, a RAM 311c, a flash translation layer (FTL) 311d, an error correction code (ECC) engine 311e, a NAND interface (I/F) circuit 311f, and a second CXL storage interface (CXL_S I/F 2) circuit 311g. The first CXL storage interface circuit 311a may include a first port PT1. The second CXL storage interface circuit 311g may include a second port PT2. The first CXL storage interface circuit 311a, the processor 311b, the RAM 311c, the flash translation layer 311d, the ECC engine 311e, the NAND interface circuit 311f, and the second CXL storage interface circuit 311g illustrated in FIG. 10 are similar or identical to the first CXL storage interface circuit 211a, the processor 211b, the RAM 211c, the flash translation layer 211d, the ECC engine 211e, the NAND interface circuit 211f, and the second CXL storage interface circuit 211g illustrated in FIG. 3B, and thus, repeated description will be omitted to avoid redundancy.

The first CXL storage interface circuit 311a may be connected with the CXL switch SW_CXL. The first CXL storage interface circuit 311a may communicate with the host 301 through the CXL switch SW_CXL. The second CXL storage interface circuit 311g may be connected with the CXL memory 320. The second CXL storage interface circuit 311g may perform the direct communication with the CXL memory 320.

The CXL memory 320 may include the CXL memory controller 321 and the buffer memory BFM. The CXL memory controller 321 may include a CXL memory interface (CXL_M I/F) circuit 321a, a processor 321b, a memory manager 321c, and a buffer memory interface (I/F) circuit 321d. The CXL memory interface circuit 321a may include a fourth port PT4. The CXL memory interface circuit 321a, the processor 321b, the memory manager 321c, and the buffer memory interface circuit 321d illustrated in FIG. 10 are similar or identical to the CXL memory interface circuit 221a, the processor 221b, the memory manager 221c, and the buffer memory interface circuit 221d illustrated in FIG. 3B, and thus, repeated description will be omitted to may be omitted redundancy.

The CXL memory interface circuit 321a may be connected with the CXL storage 310. The CXL memory interface circuit 321a may perform the direct communication with the CXL storage 310.

In an embodiment, the host 301 and the CXL storage 310 may communicate with each other by using CXL.io being an input/output protocol. The CXL.io may have a PCIe-based non-coherency input/output protocol. The host 301 and the CXL storage 310 may exchange user data or variety of information with each other by using the CXL.io.

In an embodiment, the CXL storage 310 and the CXL memory 320 may communicate with each other by using CXL.mem or by using CXL.io. The CXL.mem may be a memory access protocol that supports memory access. The CXL storage 310 may access a partial area (e.g., an area where the map data MD are stored or a CXL storage-dedicated area) of the CXL memory 320 by using the CXL.mem or CXL.io.

For example, in the initialization operation of FIG. 4 or the power-off operation of FIG. 9, the CXL storage 310 or the CXL memory 320 may send the map data MD by using the CXL.io. In the read operation of FIG. 7 or the write operation of FIG. 8, the CXL storage 310 or the CXL memory 320 may send the map data MD by using the CXL.mem. However, the present disclosure is not limited thereto.

In an embodiment, because the CXL memory 320 is not connected with the CXL switch SW_CXL and is directly connected with the CXL storage 310, the host 301 and the CXL memory 320 may not communicate with each other. The host 301 may not access the entire area of the CXL memory 320.

As described above, compared to the computing system 200 of FIG. 3B, the computing system 300 of FIG. 10 may further include the CXL switch SW_CXL. The computing system 300 may perform the initialization operation, the read operation, the write operation, and the power-off operation based on the manners described with reference to FIGS. 4 to 9. However, the communications between the host 301 and the CXL storage 310 may be performed through the CXL switch SW_CXL.

Figure 11A:
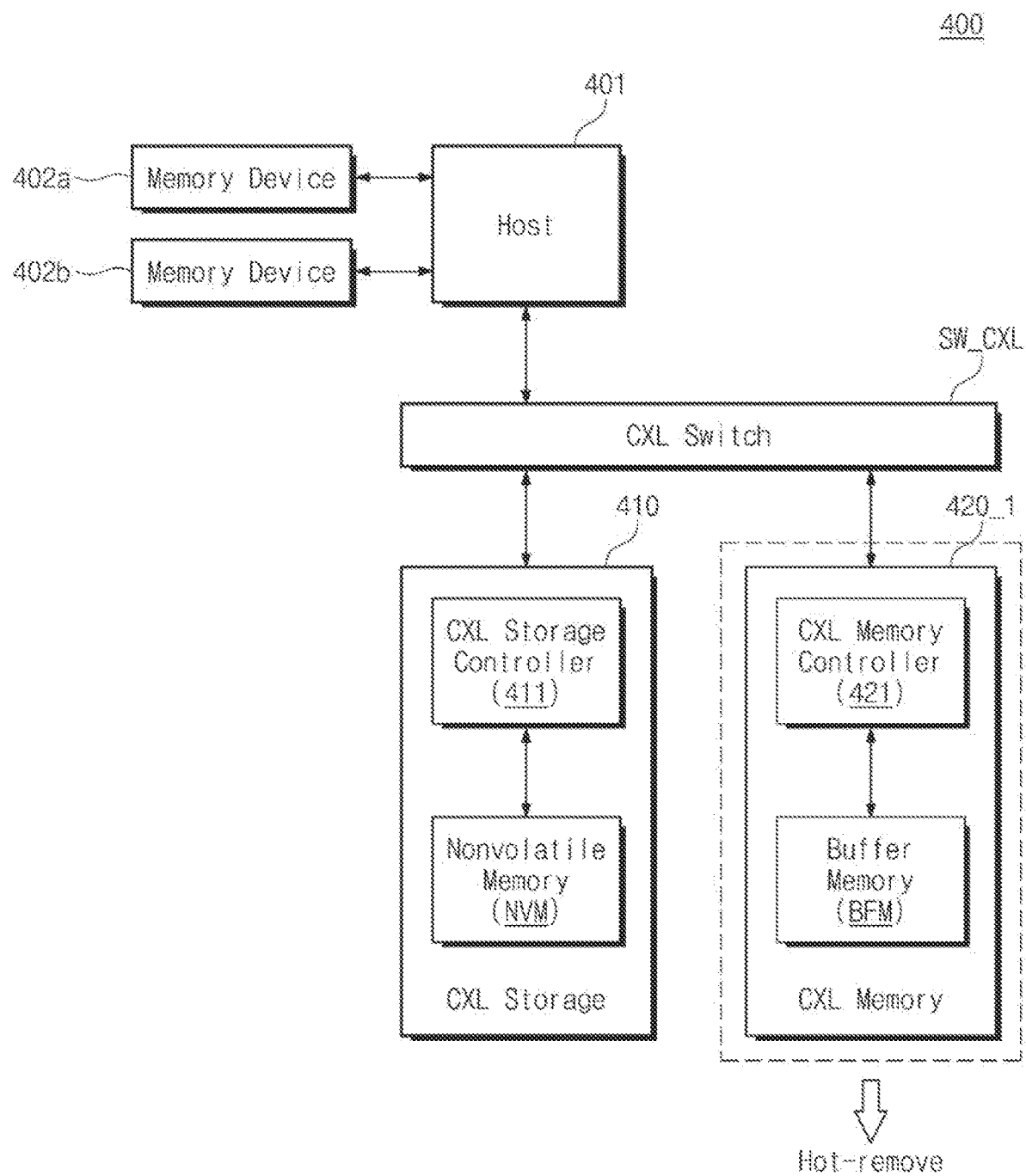
FIG. 11A and FIG. 11B are block diagrams illustrating examples of a computing system according to some embodiments.
Figure 11B:
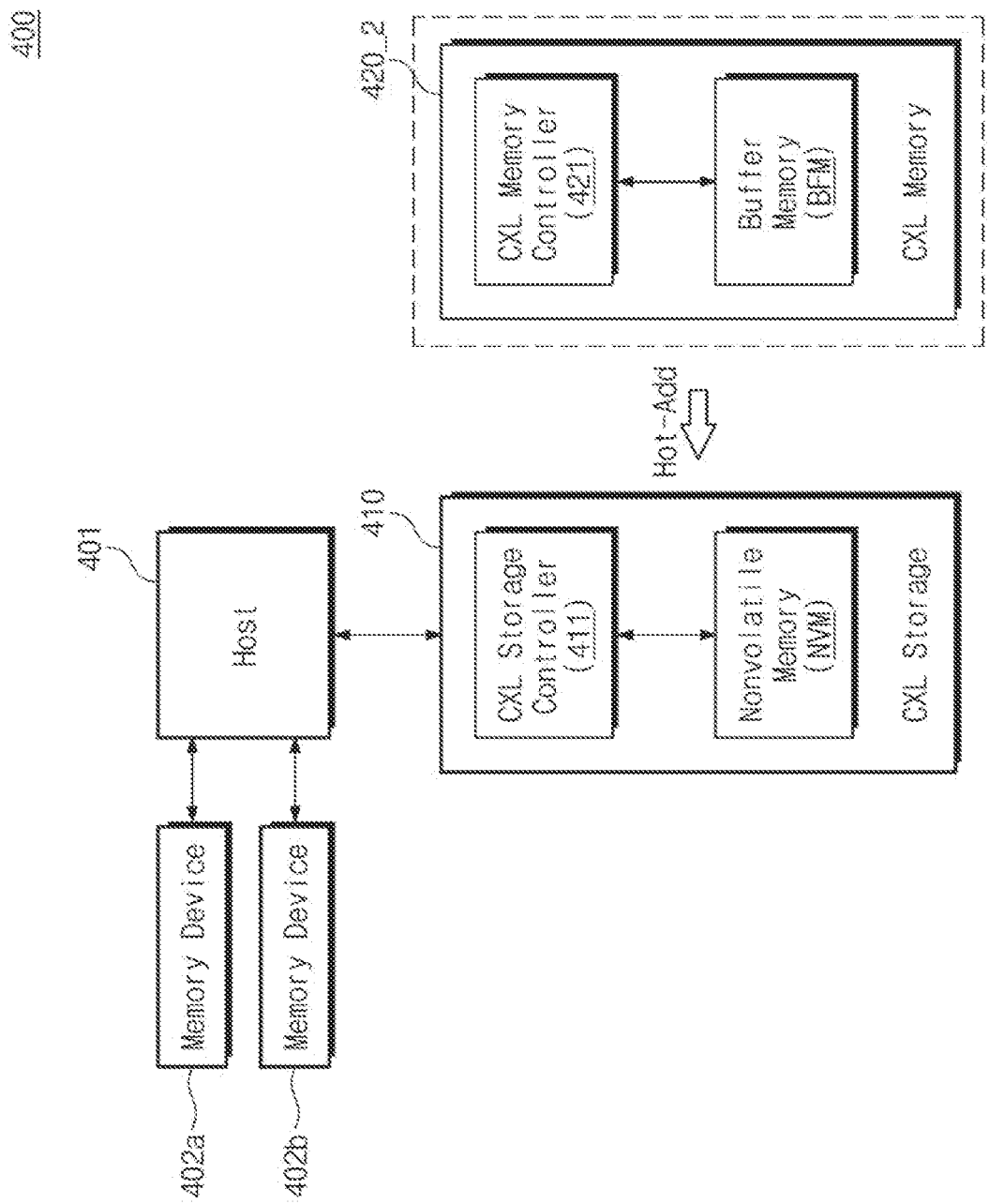

FIG. 11A and FIG. 11B are block diagrams illustrating examples of a computing system according to some embodiments. Below, for convenience of description, repeated description associated with the components described above will be omitted to avoid redundancy. Referring to FIG. 11A, a computing system 400 may include a host 401, a plurality of memory devices 402a and 402b, the CXL switch SW_CXL, CXL storage 410, and a first CXL memory 420_1.

The host 401 may be directly connected with the plurality of memory devices 402a and 402b. Each of the host 401 and the CXL storage 410 may be connected with the CXL switch SW_CXL. The host 401 and the CXL storage 410 may communicate with each other through the CXL switch SW_CXL. The CXL storage 410 and the first CXL memory 420_1 may be directly connected. As in the above description, the area of the first CXL memory 420_1 may be allocated for a dedicated area of the CXL storage 410.

In an embodiment, while the computing system 400 is being driven/used, the first CXL memory 420_1 may be disconnected or hot-removed from the CXL storage 410. In some embodiments, while the computing system 400 is being driven/used, a second CXL memory 420_2 may be connected with or hot-added to the CXL storage 410, as illustrated in FIG. 11B. In this case, the CXL storage 410 may again perform the initialization operation on the second CXL memory 420_2 through the reset operation or the hot-plug operation. For example, while the second CXL memory 420_2 is connected with the CXL storage 410, under control of the CXL storage 410, the second CXL memory 420_2 may again perform the initialization operation such that memory allocation is again performed.

As such, when the first CXL memory 420_1 is disordered or a memory capacity is insufficient, the first CXL memory 420_1 may be hot-removed from the computing system 400, and the second CXL memory 420_2 that is normal or has a sufficient memory capacity may be hot-added to the computing system 400. That is, a CXL memory according to some embodiments may support the hot-plug function. This support may mean that it is possible to expand a storage capacity and a memory capacity of a computing system through various connections.

Figure 12:
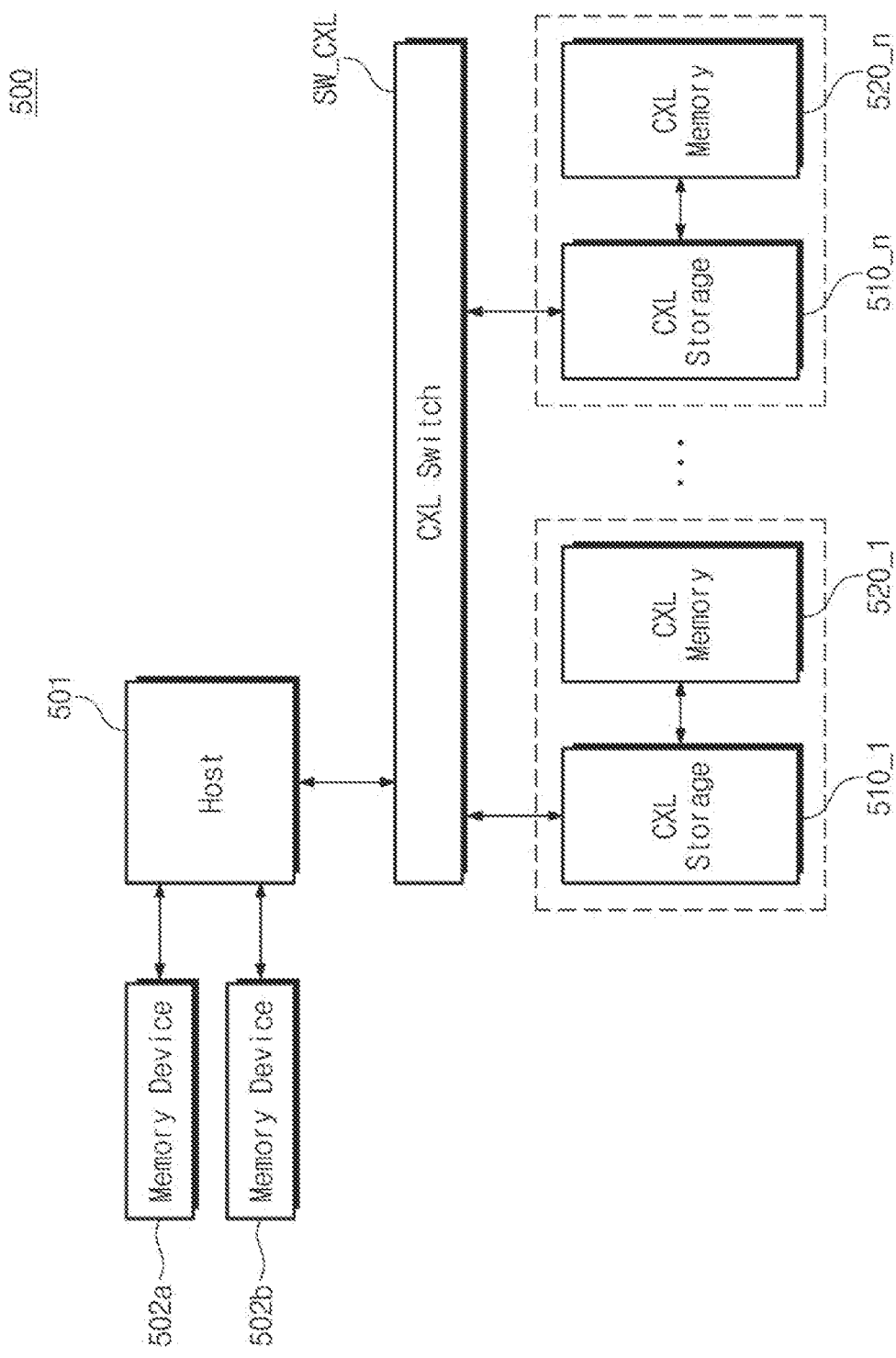
FIG. 12 is a block diagram illustrating a computing system according to some embodiments.

FIG. 12 is a block diagram illustrating a computing system according to some embodiments. Below, for convenience of description, repeated description associated with the components described above will be omitted to avoid redundancy. Referring to FIG. 12, a computing system 500 may include a host 501, a plurality of memory devices 502a and 502b, the CXL switch SW_CXL, a plurality of CXL storages 510_1 to 510_n, and a plurality of CXL memories 520_1 to 520_n.

The host 501 may be directly connected with the plurality of memory devices 502a and 502b. The host 501 and the plurality of CXL storages 510_1 to 510_n may be connected with the CXL switch SW_CXL. The host 501 and the plurality of CXL storages 510_1 to 510_n may communicate with each other through the CXL switch SW_CXL.

The plurality of CXL storages 510_1 to 510_n may be directly connected to corresponding ones of the plurality of CXL memories 520_1 to 520_n, as illustrated in FIG. 12. For example, the first CXL storage 510_1 may be directly connected with the first CXL memory 520_1, and the n-th CXL storage 510_n may be directly connected with the n-th CXL memory 520_n.

In an embodiment, the plurality of CXL storages 510_1 to 510_n may respectively allocate areas of the plurality of CXL memories 520_1 to 520_n for dedicated areas of the plurality of CXL storages 510_1 to 510_n. For example, the first CXL storage 510_1 may store the map data of the first CXL storage 510_1 in the first CXL memory 520_1, and the n-th CXL storage 510_n may store the map data of the n-th CXL storage 510_n in the n-th CXL memory 520_n.

Figure 13:
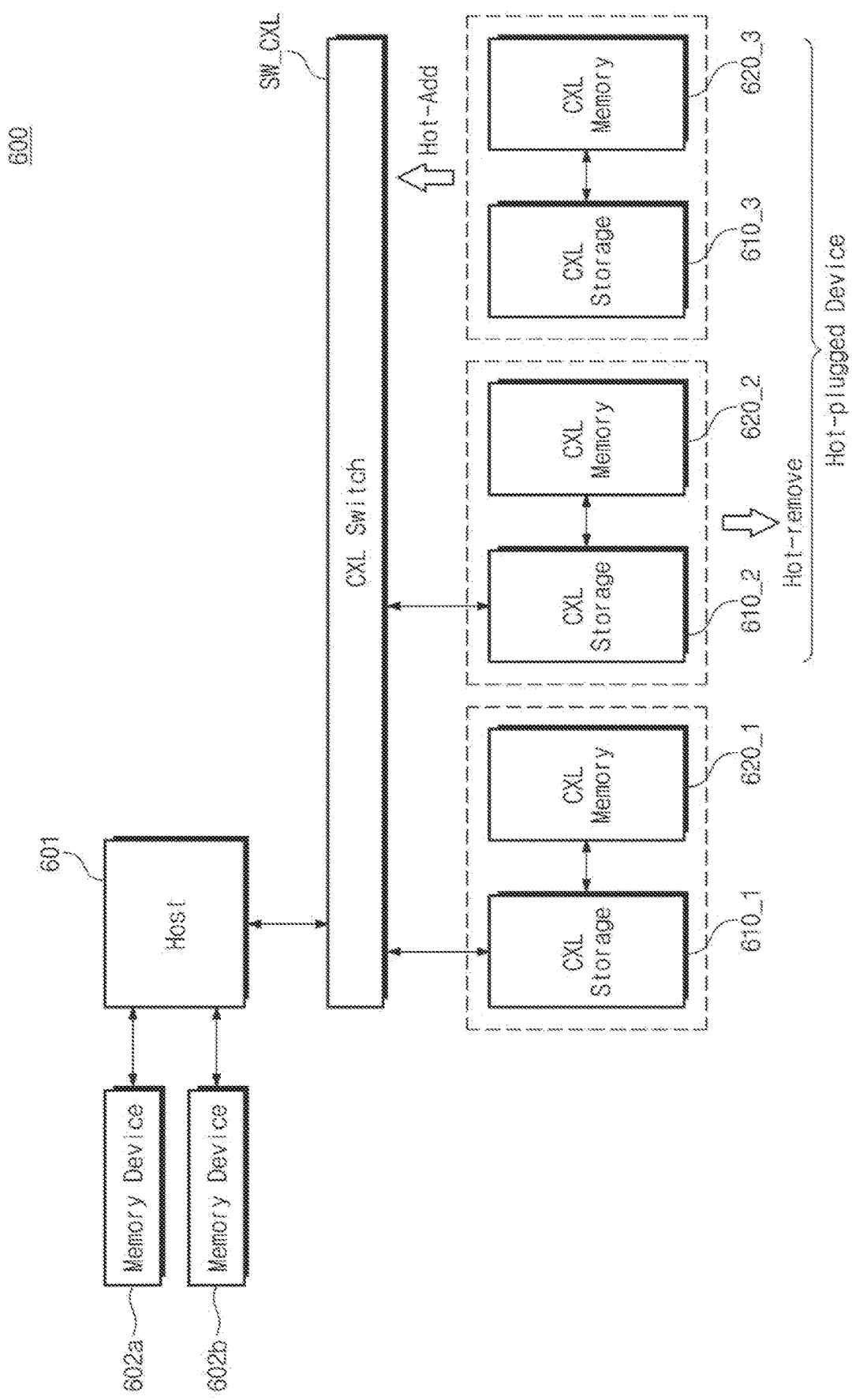
FIG. 13 is a block diagram illustrating a computing system according to some embodiments.

FIG. 13 is a block diagram illustrating a computing system according to some embodiments. Below, for convenience of description, repeated description associated with the components described above will be omitted to avoid redundancy. Referring to FIG. 13, a computing system 600 may include a host 601, a plurality of memory devices 602a and 602b, the CXL switch SW_CXL, a plurality of CXL storages 610_1, 610_2, and 610_3, and a plurality of CXL memories 620_1, 620_2, and 620_3.

The host 601 may be directly connected with the plurality of memory devices 602a and 602b. The host 601 and the plurality of CXL storages 610_1 and 610_2 may be connected with the CXL switch SW_CXL. The host 601 and the plurality of CXL storages 610_1 and 610_2 may communicate with each other through the CXL switch SW_CXL. The plurality of CXL storages 610_1 and 610_2 may be directly connected to corresponding ones of the plurality of CXL memories 620_1 and 620_2. For example, the first CXL storage 610_1 may be directly connected with the first CXL memory 620_1, and the second CXL storage 610_2 to may be directly connected with the second CXL memory 620_2. As in the above description, areas of the CXL memories 620_1 and 620_2 may be allocated for dedicated areas of the CXL storages 610_1 and 610_2.

In an embodiment, while the computing system 600 is being driven/used, some of the CXL storages 610_1 and 610_2 may be disconnected or hot-removed from the CXL switch SW_CXL. For example, while the second CXL storage 610_2 is disconnected from the CXL switch SW_CXL, the CXL memory 620_2 directly connected with the second CXL storage 610_2 may be together hot-removed. That is, the second CXL storage 610_2 and the second CXL memory 620_2 may be hot-removed from the computing system 600.

In some embodiments, while the computing system 600 is being driven/used, some CXL storages may be connected or hot-added to the CXL switch SW_CXL. For example, while the third CXL storage 610_3 is connected with the CXL switch SW_CXL, the third CXL memory 620_3 directly connected with the third CXL storage 610_3 may be together hot-added to the computing system 600. That is, the third CXL storage 610_3 and the third CXL memory 620_3 may be hot-added to the computing system 600.

In this case, the host 601 may again perform the initialization operation on devices connected with the CXL switch SW_CXL through the reset operation or the hot-plug operation. For example, while the third CXL storage 610_3 is connected with the CXL switch SW_CXL, under control of the host 601, the third CXL storage 610_3 may perform the initialization operation. Afterwards, the third CXL storage 610_3 may direct the third CXL memory 620_3 to perform the initialization operation. That is, the third CXL memory 620_3 may perform the initialization operation under control of the third CXL storage 610_3. The third CXL storage 610_3 may allocate the area of the third CXL memory 620_3 for the dedicated area of the third CXL storage 610_3. That is, a CXL storage according to some embodiments may support the hot-plug function. This support may mean that it is possible to expand a storage capacity and a memory capacity of a computing system through various connections.

Figure 14:
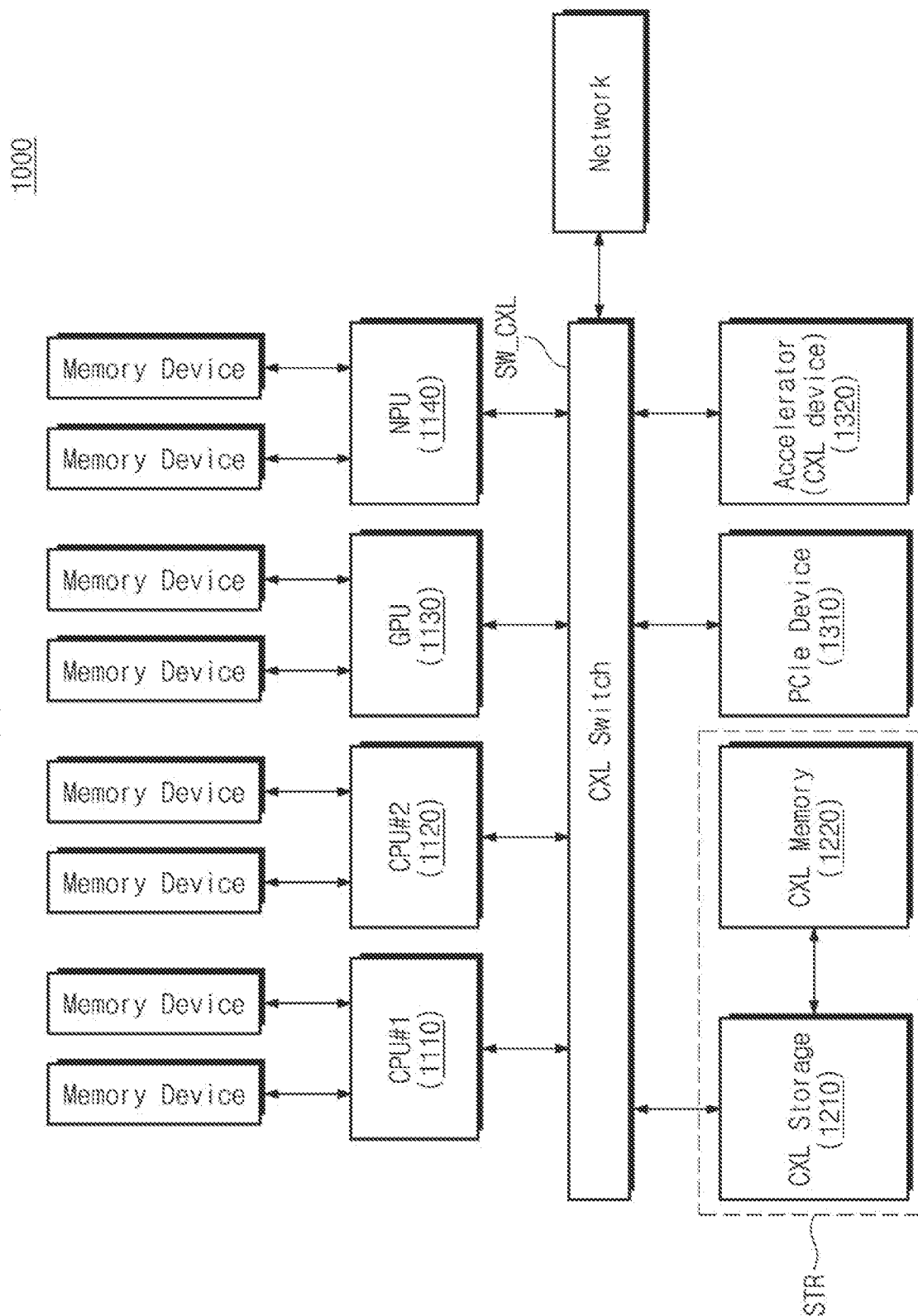
FIG. 14 is a block diagram illustrating a computing system according to some embodiments.

FIG. 14 is a block diagram illustrating a computing system according to some embodiments. For convenience of description, repeated description associated with the components described above will be omitted to avoid redundancy. Referring to FIG. 14, a computing system 1000 may include a first CPU 1110, a second CPU 1120, a GPU 1130, an NPU 1140, the CXL switch SW_CXL, a CXL storage 1210, a CXL memory 1220, a PCIe device 1310, and an accelerator (CXL device) 1320.

The first CPU 1110, the second CPU 1120, the GPU 1130, the NPU 1140, the CXL storage 1210, the PCIe device 1310, and the accelerator (CXL device) 1320 may be connected in common with the CXL switch SW_CXL and may communicate with each other through the CXL switch SW_CXL. The CXL memory 1220 may not be connected with the CXL switch SW_CXL. The CXL memory 1220 may be directly connected with the CXL storage 1210.

In an embodiment, each of the first CPU 1110, the second CPU 1120, the GPU 1130, and the NPU 1140 may be the host described with reference to FIGS. 1 to 13 and may be directly connected with individual memory devices. For example, as illustrated in FIG. 14, the first CPU 1110 may be directly connected with two memory devices, and the GPU 1130 may be directly connected with two memory devices, etc.

In an embodiment, the CXL storage 1210 and the CXL memory 1220 may be the CXL storage and the CXL memory described with reference to FIGS. 3A to 13, and one or more of the first CPU 1110, the second CPU 1120, the GPU 1130, and the NPU 1140 may not access the CXL memory 1220. At least a partial area or the entire area of the CXL memory 1220 may be allocated for a dedicated area of the CXL storage 1210. The CXL storage 1210 and the CXL memory 1220 may be used as a storage space STR of the computing system 1000.

In an embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the CXL storage 1210 through the CXL switch SW_CXL. However, the PCIe device 1310 or the accelerator 1320 may not access the CXL memory 1220.

In an embodiment, the CXL switch SW_CXL may be connected with an external network (Network) or Fabric and may be configured to communicate with an external server through the external network or Fabric.

Figure 15:
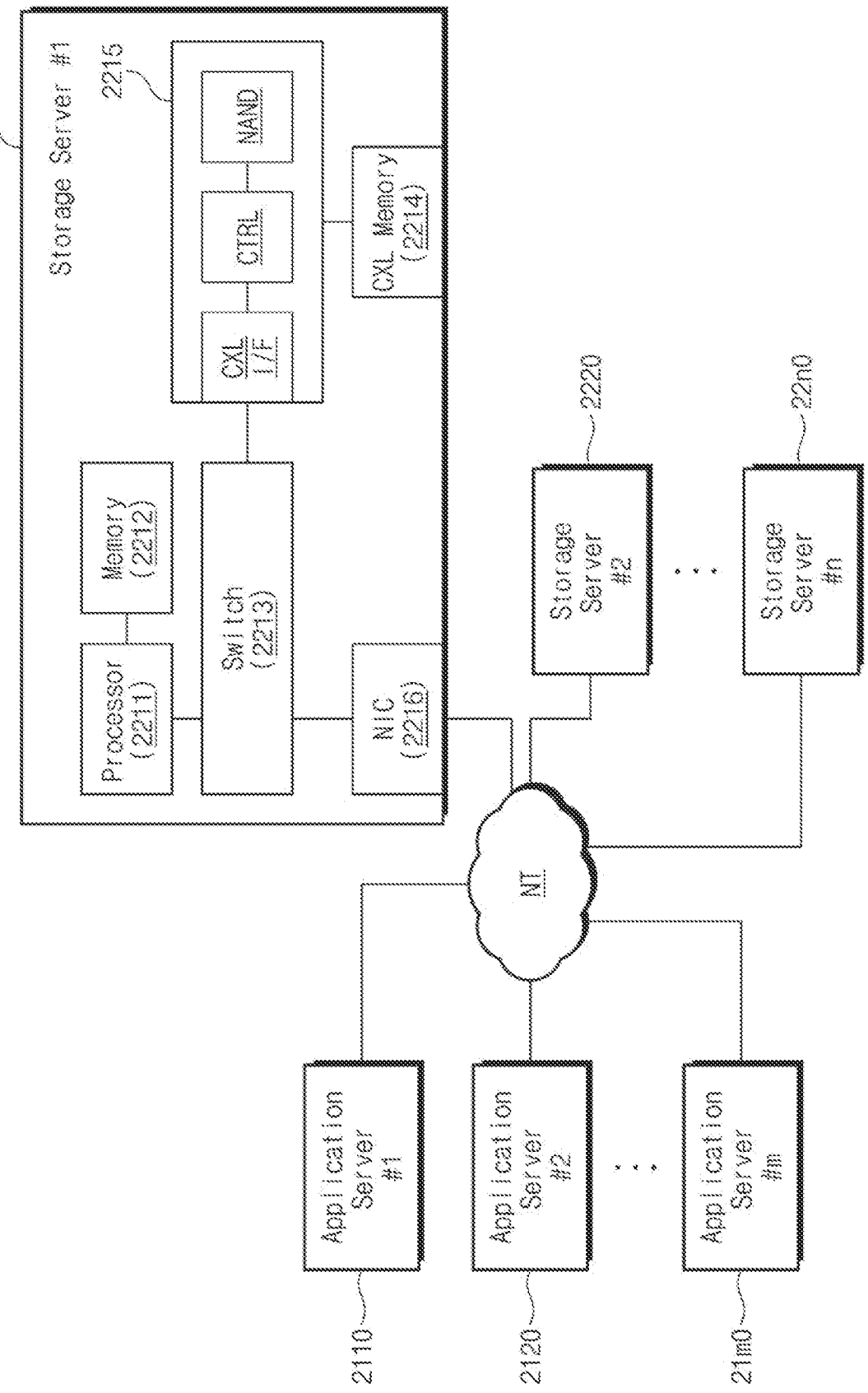
FIG. 15 is a block diagram illustrating a data center to which a computing system according to some embodiments is applied.

FIG. 15 is a block diagram illustrating a data center to which a computing system according to some embodiments is applied. Referring to FIG. 15, a data center 2000 that is a facility collecting various data and providing services may be referred to as a "data storage center". The data center 2000 may be a system for operating a search engine and a database, and may be a computing system used in a business such as a bank or in a government institution. The data center 2000 may include application servers 2110 to 21*m*0 and storage servers 2210 to 22*n*0. The number of application servers and the number of storage servers may be variously selected depending on an embodiment, and the number of application servers and the number of storage servers may be different from each other.

Below, a configuration of the first storage server 2210 will be mainly described. The application servers 2110 to 21*m*0 may have similar structures, the storage servers 2210 to 22*n*0 may have similar structures, and the application servers 2110 to 21*m*0 and the storage servers 2210 to 22*n*0 may communicate with each other over a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a DDR SDRAM (Double Data Rate Synchronous DRAM), an HBM (High Bandwidth Memory), an HMC (Hybrid Memory Cube), a DIMM (Dual In-line Memory Module), an Optane DIMM, and/or an NVMDIMM (Non-Volatile DIMM). The processor 2211 and the memory 2212 may be directly connected, and the numbers of processors and memories included in one storage server 2210 may be variously selected.

In an embodiment, the processor 2211 and the memory 2212 may provide a processor-memory pair. In an embodiment, the number of processors 2211 and the number of memories 2212 may be different from each other. The processor 2211 may include a single core processor or a multi-core processor. The detailed description of the storage server 2210 may be similarly applied to the application servers 2110 to 21*m*0.

The switch 2213 may be configured to arbitrate or route the communications between various components included in the first storage server 2210. In an embodiment, the switch 2213 may be implemented with the CXL switch SW_CXL described with reference to 10. That is, the switch 2213 may be a switch implemented based on the CXL protocol.

The CXL memory 2214 may be directly connected with the storage device 2215. In an embodiment, the CXL memory 2214 may be accessed only by the storage device 2215, and the processor 2211 may not access the CXL memory 2214. As described with reference to FIGS. 1 to 14, the CXL memory 2214 may be allocated for a dedicated memory or a buffer memory of the storage device 2215.

The storage device 2215 may include a CXL interface circuit CXL IF, a controller CTRL, and a NAND flash NAND. Depending on a request of the processor 2211, the storage device 2215 may store data or may output the stored data. In an embodiment, the storage device 2215 may be implemented with the CXL storage described with reference to FIGS. 1 to 14. In an embodiment, as in the description given with reference to FIGS. 1 to 14, at least a partial area or the entire area of the CXL memory 2214 may be allocated for a dedicated area, and the dedicated area may be used as a buffer memory (i.e., may be used to store map data in the CXL memory 2214).

According to an embodiment, the application servers 2110 to 21*m*0 may not include the storage device 2215. The storage server 2210 may include at least one or more storage devices 2215. The number of storage devices 2215 included in the storage server 2210 may be variously selected depending on an embodiment.

The NIC 2216 may be connected with the switch 2213, which as described above may be the CXL switch SW_CXL. The NIC 2216 may communicate with the remaining storage servers 2220 to 22*n*0 or the application servers 2110 to 21*m*0 over the network NT.

In an embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc. and may be connected with the processor 2211 and/or the switch 2213 through the host bus interface. In an embodiment, the NIC 2216 may be integrated with at least one of the processor 2211, the switch 2213, and the storage device 2215.

In an embodiment, the network NT may be implemented by using a Fibre channel (FC) or an Ethernet. In this case, the FC may be a medium that is used in high-speed data transmission and may use an optical switch that provides high performance/high availability. Storage servers may be provided as file storage, block storage, or object storage depending on an access manner of the network NT.

In an embodiment, the network NT may be a storage-dedicated network such as a storage area network (SAN). For example, the SAN may be a FC-SAN that uses a FC network and is implemented depending on a FC protocol (FCP). For another example, the SAN may be an IP-SAN that uses a TCP/IP network and is implemented depending on an iSCSI (SCSI over TCP/IP or Internet SCSI). In an embodiment, the network NT may be a legacy network such as a TCP/IP network. For example, the network NT may be implemented depending on the following protocol: FCoE (FC over Ethernet), NAS (Network Attached Storage), or NVMe-oF (NVMe over Fabrics).

In an embodiment, at least one of the application servers 2110 to 21m0 may store data, which are store-requested by a user or a client, in one of the storage servers 2210 to 22n0 over the network NT. At least one of the application servers 2110 to 21m0 may obtain data, which are read-requested by the user or the client, from one of the storage servers 2210 to 22n0 over the network NT. For example, at least one of the application servers 2110 to 21m0 may be implemented with a web server, a database management system (DBMS), etc.

In an embodiment, at least one of the application servers 2110 to 21m0 may access a memory, a CXL memory, or a storage device included in any other application server over the network NT or may access memories, CXL memory, or storage devices included in the storage servers 2210 to 22n0 over the network NT. However, because the CXL memory 2214 is not directly connected with the switch 2213, at least one of the application servers 2110 to 21m0 may not access the CXL memory 2214 included in the first storage server 2210 over the network NT.

As such, at least one of the application servers 2110 to 21m0 may perform various operations on data stored in the remaining application servers and/or storage servers. For example, at least one of the application servers 2110 to 21m0 may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to some embodiments, a host and a storage device may communicate through a first interface, and the storage device and a memory device may communicate through a second interface. Accordingly, a computing system with improved performance is provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A computing system comprising:
a host;
a memory including a volatile memory and a memory controller; and
a storage device that is connected with the host through a first interface and that includes a nonvolatile memory and a storage controller, the storage device being configured to communicate with the host through a first port, to communicate with the memory through a second port, and to manage the memory,
wherein the memory is connected with the storage device through a second interface that is physically separated from the first interface,
wherein, in an initialization operation, the storage controller sends map data that is stored in the nonvolatile memory to the memory through the second interface, and
wherein, in the initialization operation, the memory controller stores the map data in the volatile memory.

2. The computing system of claim 1, wherein the first interface and the second interface are based on a compute express link (CXL) protocol.

3. The computing system of claim 1, wherein the memory is accessible only by the storage device.

4. The computing system of claim 1, wherein, in the initialization operation, the storage controller sends a device information request to the memory through the second interface, and
wherein the memory controller sends a device information response to the storage device through the second interface based on the device information request.

5. The computing system of claim 1, wherein, after the initialization operation, the storage controller sends a read request to the memory through the second interface, and
wherein the memory controller sends partial map data to the storage device through the second interface based on the read request.

6. The computing system of claim 1, wherein the host sends a first read request to the storage device through the first interface,
wherein, based on the first read request, the storage controller sends a second read request to the memory through the second interface, reads data from the nonvolatile memory based on partial map data received from the memory, and sends the data to the host through the first interface, and
wherein the memory controller sends the partial map data corresponding the second read request to the storage device through the second interface based on the second read request.

7. The computing system of claim 1, wherein the host sends a first write request to the storage device through the first interface,
wherein, based on the first write request, the storage controller writes data corresponding to the first write request in the nonvolatile memory, sends a first write response that corresponds to the first write request to the host through the first interface, and sends a second write request for partial map data that is updated with regard to the first write request to the memory through the second interface, and
wherein, based on the second write request, the memory controller writes the partial map data in the volatile memory and sends a second write response that corresponds to the second write request to the storage device through the second interface.

8. The computing system of claim 1, wherein the host sends power-off information to the storage device through the first interface, wherein, based on the power-off information, the storage controller sends a read request to the memory through the second interface, stores map data included in a read response that is received from the memory in the nonvolatile memory, and sends a response to the power-off information to the host through the first interface, and wherein, based on the read request, the memory controller reads the map data from the volatile memory and sends the read response that includes the map data to the storage device through the second interface.

9. The computing system of claim 1, wherein the host and the storage device communicate through the first interface using CXL.io, and wherein the storage device and the memory communicate through the second interface using the CXL.io or CXL.mem.

10. The computing system of claim 1, wherein the memory supports a hot-plug function.

11. An operating method of a computing system which includes a host, a storage device, and a memory, the host and the storage device being connected through a first interface, and the storage device and the memory being connected through a second interface, the operating method comprising:

sending, by the storage device, map data that is stored in a nonvolatile memory of the storage device to the memory through the second interface in an initialization operation;

storing, by the memory, the map data in a volatile memory of the memory in the initialization operation;

sending, by the storage device, a first read request to the memory through the second interface after the initialization operation; and sending, by the memory, first partial map data to the storage device through the second interface based on the first read request, wherein the first interface and the second interface are based on a compute express link (CXL) protocol and the first interface is physically separated from the second interface.

12. The operating method of claim 11, wherein the memory is accessible only by the storage device.

13. The operating method of claim 11, further comprising:
sending, by the storage device, a device information request to the memory through the second interface in the initialization operation; and
sending, by the memory, a device information response to the storage device through the second interface based on the device information request.

14. The operating method of claim 11, further comprising:
sending, by the host, a second read request to the storage device through the first interface after the initialization operation;
sending, by the storage device, a third read request to the memory through the second interface based on the second read request;
reading, by the memory, second partial map data that corresponds to a logical block address included in the third read request based on the third read request;
sending, by the memory, a third read response that includes the second partial map data to the storage device through the second interface;
reading, by the storage device, data from the nonvolatile memory based on the second partial map data that is included in the third read response; and sending, by the storage device, a second read response that includes the data to the host through the first interface.

15. The operating method of claim 11, further comprising:
sending, by the host, a first write request to the storage device through the first interface after the initialization operation;
writing, by the storage device, data that corresponds to the first write request in the nonvolatile memory based on the first write request;
generating or updating, by the storage device, third partial map data that corresponds to a logical block address included in the first write request;
sending, by the storage device, a first write response that corresponds to the first write request to the host through the first interface;
sending, by the storage device, a second write request that includes the third partial map data to the memory through the second interface;
storing, by the memory, the third partial map data in the volatile memory based on the second write request; and
sending, by the memory, a second write response that corresponds to the second write request to the storage device through the second interface.

16. The operating method of claim 11, further comprising:
sending, by the host, power-off information to the storage device through the first interface;
sending, by the storage device, a second read request to the memory through the second interface based on the power-off information;
reading, by the memory, map data from the volatile memory based on the second read request;
sending, by the memory, a second read response that includes the map data to the storage device through the second interface;
storing, by the storage device, the map data that is included in the second read response in the nonvolatile memory; and
sending, by the storage device, a response to the power-off information to the host through the first interface.

17. The operating method of claim 11, wherein the host and the storage device communicate through the first interface using CXL.io, and wherein the storage device and the memory communicate through the second interface using the CXL.io or CXL.mem.

18. A computing system comprising:
a host;
a storage device that includes a nonvolatile memory and a storage controller;
a memory that includes a volatile memory and a memory controller; and
a switch connected with the host and the storage device,
wherein the memory is connected with the storage device,
wherein the storage device is configured to communicate with the host through a first port, to communicate with the memory through a second port, and to manage the memory,
wherein, in an initialization operation, the storage controller sends map data that is stored in the nonvolatile memory to the memory through the second port, and
wherein, in the initialization operation, the memory controller stores the map data in the volatile memory.

19. The computing system of claim 18, wherein, in the initialization operation, the storage controller sends a device information request to the memory through the second port, and wherein the memory controller sends a device information response to the storage device based on the device information request.

20. The computing system of claim 18, wherein the storage controller communicates with the host through the switch using CXL.io and directly communicates with the memory by using the CXL.io or CXL.mem.

* * * * *